US012662630B2

(12) United States Patent
Yao et al.

(10) Patent No.: US 12,662,630 B2
(45) Date of Patent: Jun. 23, 2026

(54) LIQUID CRYSTAL COMPOSITION AND LIQUID CRYSTAL DISPLAY DEVICE

(71) Applicant: Jiangsu Hecheng Display Technology Co., Ltd., Nanjing (CN)

(72) Inventors: Lifang Yao, Nanjing (CN); Wenquan Ding, Nanjing (CN); Di He, Nanjing (CN); Panpan Wang, Nanjing (CN); Huijuan Dai, Nanjing (CN); Fei Zhao, Nanjing (CN)

(73) Assignee: Jiangsu Hecheng Display Technology Co., Ltd., Nanjing (CN)

( * ) Notice: Subject to any disclaimer, the term of this patent is extended or adjusted under 35 U.S.C. 154(b) by 0 days.

(21) Appl. No.: 19/135,547

(22) PCT Filed: Nov. 7, 2023

(86) PCT No.: PCT/CN2023/130198

§ 371 (c)(1),
(2) Date: Jun. 4, 2025

(87) PCT Pub. No.: WO2024/120102

PCT Pub. Date: Jun. 13, 2024

(65) Prior Publication Data

US 2026/0002076 A1 Jan. 1, 2026

(30) Foreign Application Priority Data

Dec. 9, 2022 (CN) ........................ 202211586964.X

(51) Int. Cl.

| | |
|---|---|
| ***G02F 1/1333*** | (2006.01) |
| ***C09K 19/34*** | (2006.01) |
| *C09K 19/04* | (2006.01) |

(52) U.S. Cl.

CPC .. *C09K 19/3491* (2013.01); *C09K 2019/0466* (2013.01)

(58) Field of Classification Search

CPC ............ C09K 19/3408; C09K 19/3491; C09K 2019/0466; G02F 1/1333

See application file for complete search history.

(56) References Cited

U.S. PATENT DOCUMENTS

| | | | |
|---|---|---|---|
| 2017/0362506 A1 | 12/2017 | Hirschmann et al. | |
| 2020/0032143 A1 | 1/2020 | Takata | |
| 2021/0139451 A1 | 5/2021 | Lietzau et al. | |
| 2021/0179942 A1 | 6/2021 | Deing et al. | |
| 2021/0222067 A1 | 7/2021 | Hirschmann et al. | |
| 2022/0002623 A1 | 1/2022 | Yao et al. | |
| 2023/0045269 A1 | 2/2023 | Goetz et al. | |
| 2023/0257654 A1 | 8/2023 | He et al. | |
| 2026/0002076 A1* | 1/2026 | Yao | C09K 19/3491 |

FOREIGN PATENT DOCUMENTS

| | | | | |
|---|---|---|---|---|
| CN | 107257839 A | 10/2017 | | |
| CN | 110300746 A | 10/2019 | | |
| CN | 110396411 A | 11/2019 | | |
| CN | 110770219 A | 2/2020 | | |
| CN | 112029512 A | 12/2020 | | |
| CN | 112779025 A | 5/2021 | | |
| CN | 112996882 A | 6/2021 | | |
| CN | 113072962 A | 7/2021 | | |
| CN | 113845924 A | 12/2021 | | |
| CN | 114196420 A | 3/2022 | | |
| CN | 114525140 A | 5/2022 | | |
| CN | 115247070 A | 10/2022 | | |
| CN | 115247071 A | 10/2022 | | |
| CN | 116064051 A | 5/2023 | | |
| JP | 2019147859 A | 9/2019 | | |
| JP | 2021-028299 A | 2/2021 | | |
| JP | 2022-050328 A | 3/2022 | | |
| TW | 201837024 A | 10/2018 | | |
| TW | 202200757 A | 1/2022 | | |
| TW | 202200762 A | 1/2022 | | |
| WO | WO 2018155340 A1 | 8/2018 | | |
| WO | WO 2019107394 A1 | 6/2019 | | |
| WO | WO 2022136223 A1 | 6/2022 | | |
| WO | WO-2024120102 A1 | * | 6/2024 | G02F 1/134363 |
| WO | WO-2025139911 A1 | * | 7/2025 | G02F 1/1333 |

OTHER PUBLICATIONS

Notification of Granting Patent Right for Invention for CN 202211586964.X dated Mar. 12, 2025 (with listing of allowed claims and English translation thereof).
PCT Search Report dated Feb. 18, 2024.
English translation of PCT Search Report.
PCT Written Opinion dated Feb. 18, 2024.
English machine translation of PCT Written Opinion.

* cited by examiner

*Primary Examiner* — Geraldina Visconti
(74) *Attorney, Agent, or Firm* — Hoffmann & Baron, LLP

(57) ABSTRACT

The present invention provides a liquid crystal composition and a liquid crystal display device. The liquid crystal composition comprises at least one compound of general formula I and at least one compound selected from compounds of general formula II-1 and/or general formula II-2. The liquid crystal composition provided in the present invention has an appropriate optical anisotropy, an appropriate clearing point, a lower rotational viscosity, a higher $K_{ave}$ value and a higher $\varepsilon_{\perp}/\Delta\varepsilon$ ratio, and has higher transmittance and contrast rate, and a remarkable low-temperature storage performance at the same time.

23 Claims, No Drawings

LIQUID CRYSTAL COMPOSITION AND LIQUID CRYSTAL DISPLAY DEVICE

CROSS-REFERENCE TO RELATED APPLICATIONS

This application is the National Stage of International Application No. PCT/CN2023/130198, filed Nov. 7, 2023, which claims the benefit of Chinese Application No. 202211586964.X, filed Dec. 9, 2022, the contents of which is incorporated by reference herein.

TECHNICAL FIELD

The present invention belongs to the technical field of liquid crystal materials, specifically relates to a liquid crystal composition and a liquid crystal display device, and especially relates to a liquid crystal composition having a positive dielectric anisotropy, as well as a liquid crystal display device.

BACKGROUND ARTS

Liquid crystal materials are mixtures of organic rod-shaped small molecular compounds that have both the fluidity of a liquid and the anisotropy of a crystal at a certain temperature. Liquid crystal display devices work by utilizing the optical anisotropy and dielectric anisotropy of the liquid crystal material itself, and now have been broadly used. Based on the operating modes of the liquid crystal molecules, liquid crystal display elements can be classified into the following types: PC (phase change), TN (twist nematic), STN (super twisted nematic), DS (dynamic scattering), FLC (ferroelectric liquid crystal), GH (guest-host), ECB (electrically controlled birefringence), OCB (optically compensated bend), IPS (in-plane switching), VA (vertical alignment), FFS (fringe field switching), FPA (field-induced photo-reactive alignment) and so forth.

The basic electro-optical properties of the IPS mode with uniformly arranged and twistedly arranged nematic-phase liquid crystals have been experimentally investigated in the early 1970s, and the IPS mode is characterized by fabricating a pair of electrodes on the same substrate and no electrodes on the other substrate, and controlling the arrangement of the liquid crystal molecules by applying a transverse electric field between the pair of electrodes, and this mode can thus be referred to as a transverse-field mode. In the IPS mode, nematic-phase liquid crystal molecules are arranged in the two substrates uniformly and parallelly, and two polarizers are placed orthogonally. When no electric field is applied in the IPS mode, the incident light is blocked by the two orthogonal polarizers and a dark state is present; and when an electric field is applied, liquid crystal molecules rotate, causing a delay, and light thereby leaks from the two orthogonal polarizers. The advantages of using panels with IPS mode are large viewing angle and accurate color reproduction, but the disadvantages are more significant light leakage and slower response speed.

With the wide application of TFT-type LCDs, the requirements on the performance thereof constantly increase. High image display quality requires those having a faster response speed, a lower energy consumption, and higher low-temperature reliability, in addition to higher contrast rate and transmittance, especially for the IPS-type liquid crystal display mode. This means that liquid crystal materials need to have higher contrast rate and transmittance, higher elasticity constants, higher dielectric constants and low-temperature reliability, and the increase of these properties needs improvements of liquid crystal materials.

According to the equation of the transmittance for IPS mode $T \propto |\Delta\varepsilon/\varepsilon_\perp$ (T represents transmittance, "$\propto$" represents the "inverse proportion" relationship, and $\varepsilon_\perp$ represents the dielectric constant perpendicular to the direction of the molecular axis). If an improvement of the transmittance of the liquid crystal is wanted, it might attempt to decrease the $\Delta\varepsilon$ of liquid crystal medium. But in general, the adjustment range for the drive voltage of the same product is limited. In addition, the liquid crystal molecules will tilt towards the Z axis under the action of the vertical component of the edge electric field, resulting in the change of its optical anisotropy. According to the equation $$T = \sin^2(2\chi)\sin^2\left(\frac{\pi\Delta nd}{\lambda}\right)$$

(wherein, $\chi$ is the angle between the optical axis of the liquid crystal layer and the optical axis of the polarizer, $\Delta$n is the optical anisotropy, d is the cell gap, and $\lambda$ is the wavelength), it can be seen that effective $\Delta$n*d will affect T. If an improvement of the transmittance of the positive liquid crystal is wanted, increasing $\Delta$n*d can be taken into consideration, but the retardation amount for each product is designed to be fixed.

In another aspect, based on the light leakage performance test of traditional IPS-LCD, the main causes of the light leakage issues of liquid crystal display device are as follows: LC scattering, rubbing uniformity, CF/TFT scattering, and polarize ability, wherein, LC scattering accounts for 63% of the factors affecting light leakage performance.

According to the following equation: LC Scattering $$\propto \frac{d \cdot \Delta n^2 \cdot (n_e + n_o)^2}{K_{ave}},$$

wherein, d represents the cell gap of the liquid crystal cell, $n_e$ represents the refractive index of extraordinary light, $n_o$ represents the refractive index of ordinary light.

In order to increase the LC scattering of the liquid crystal materials, increasing average elastic constant $K_{ave}$ (wherein, $K_{ave}=(K_{11}+K_{22}+K_{33})/3$) is needed to improve the LC scattering. In the situation of increasing the $K_{ave}$, the light leakage of the liquid crystal material can be decreased.

In addition, the relationship between the contrast rate (CR) and the luminance (L) is as follows:

$$CR = L_{255}/L_0 \times 100\%,$$

wherein, $L_{255}$ is the on-state luminance, and $L_0$ is the off-state luminance. It can be seen that CR is significantly affected by the change of $L_0$. In the off state, $L_0$ has nothing to do with the dielectric performance of the liquid crystal molecule, but is related to the LC Scattering of the liquid crystal material itself. The smaller the LC Scattering, the smaller the $L_0$, and the CR is thereby significantly increased.

In view of the above, common methods for improving the contrast rate and transmittance may be considered from the following two aspects: (1) keeping the dielectric anisotropy $\Delta\varepsilon$ of the liquid crystal composition unchanged, the transmittance may be effectively improved by increasing $\varepsilon_\perp$; (2)

increasing the value of the average elastic constant $K_{ave}$ of a liquid crystal composition, such that the liquid crystal molecules become more organized, and have less light leakage, and thereby improving the transmittance. However, the $\varepsilon_{\perp}/\Delta\varepsilon$ ratio of the liquid crystal composition provided in the prior art is lower and $K_{ave}$ is lower, causing an insufficient transmittance, a slow response and a poor low-temperature storage performance. Therefore, how to provide a liquid crystal composition that can solve the above problems is still an urgent technical problem to be solved in this field.

SUMMARY OF THE INVENTION

Regarding the disadvantages in the prior art, it is an object of the present invention to provide a liquid crystal composition and a liquid crystal display device. Via designing the specific constitution of the liquid crystal composition and the structures of the compounds, the liquid crystal composition provided in the present invention has a higher $K_{ave}$ value and a higher $\varepsilon_{\perp}/\Delta\varepsilon$ ratio, and the liquid crystal composition obtained thereby has higher transmittance and contrast rate, and a remarkable low-temperature storage performance at the same time.

To realize this object, the present invention adopts the following technical solutions:

In a first aspect, the present application provides a liquid crystal composition comprising at least one compound of general formula I and at least one compound selected from general formula II-1 and/or general formula II-2:

I

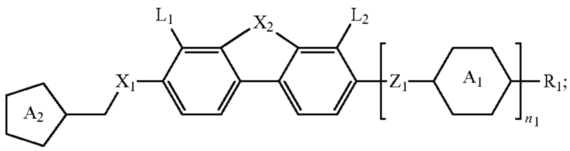

II-1

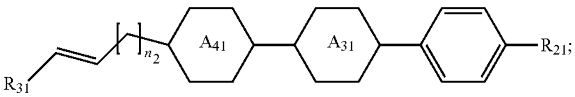

II-2

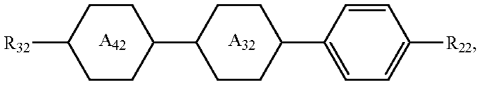

wherein, $R_1$ represents —H, $C_{1-12}$ (for example, it can be $C_1$, $C_2$, $C_3$, $C_4$, $C_5$, $C_6$, $C_7$, $C_8$, $C_9$, $C_{10}$, $C_{11}$ or $C_{12}$) halogenated or unhalogenated linear alkyl, $C_{3-12}$ (for example, it can be $C_3$, $C_4$, $C_5$, $C_6$, $C_7$, $C_8$, $C_9$, $C_{10}$, $C_{11}$ or $C_{12}$) halogenated or unhalogenated branched alkyl, $C_{1-12}$ (for example, it can be $C_1$, $C_2$, $C_3$, $C_4$, $C_5$, $C_6$, $C_7$, $C_8$, $C_9$, $C_{10}$, $C_{11}$ or $C_{12}$) halogenated or unhalogenated alkoxy, $C_{2-12}$ (for example, it can be $C_2$, $C_3$, $C_4$, $C_5$, $C_6$, $C_7$, $C_8$, $C_9$, $C_{10}$, $C_{11}$ or $C_{12}$) halogenated or unhalogenated alkenyl, $C_{2-12}$ (for example, it can be $C_2$, $C_3$, $C_4$, $C_5$, $C_6$, $C_7$, $C_8$, $C_9$, $C_{10}$, $C_{11}$ or $C_{12}$) halogenated or unhalogenated alkenoxy,

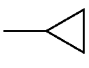 , 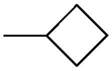 or 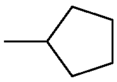 ;

$R_{21}$ and $R_{32}$ each independently represents $C_{1-12}$ (for example, it can be $C_1$, $C_2$, $C_3$, $C_4$, $C_5$, $C_6$, $C_7$, $C_8$, $C_9$, $C_{10}$, $C_{11}$ or $C_{12}$) alkyl, $C_{1-12}$ (for example, it can be $C_1$, $C_2$, $C_3$, $C_4$, $C_5$, $C_6$, $C_7$, $C_8$, $C_9$, $C_{10}$, $C_{11}$ or $C_{12}$) alkoxy, $C_{2-12}$ (for example, it can be $C_2$, $C_3$, $C_4$, $C_5$, $C_6$, $C_7$, $C_8$, $C_9$, $C_{10}$, $C_{11}$ or $C_{12}$) alkenyl, or $C_{2-12}$ (for example, it can be $C_2$, $C_3$, $C_4$, $C_5$, $C_6$, $C_7$, $C_8$, $C_9$, $C_{10}$, $C_{11}$ or $C_{12}$) alkenoxy;

$R_{22}$ represents halogen atom, $C_{1-5}$ (for example, it can be $C_1$, $C_2$, $C_3$, $C_4$ or $C_5$) halogenated alkyl, $C_{1-5}$ (for example, it can be $C_1$, $C_2$, $C_3$, $C_4$ or $C_5$) halogenated alkoxy, $C_{2-5}$ (for example, it can be $C_2$, $C_3$, $C_4$ or $C_5$) halogenated alkenyl, or $C_{2-5}$ (for example, it can be $C_2$, $C_3$, $C_4$ or $C_5$) halogenated alkenoxy;

$R_{31}$ represents —H, $C_{1-12}$ (for example, it can be $C_1$, $C_2$, $C_3$, $C_4$, $C_5$, $C_6$, $C_7$, $C_8$, $C_9$, $C_{10}$, $C_{11}$ or $C_{12}$) alkyl, or $C_{1-12}$ (for example, it can be $C_1$, $C_2$, $C_3$, $C_4$, $C_5$, $C_6$, $C_7$, $C_8$, $C_9$, $C_{10}$, $C_{11}$ or $C_{12}$) alkoxy;

ring

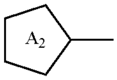

represents

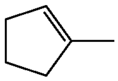 , 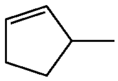 or 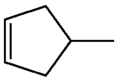 ;

ring

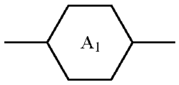

represents

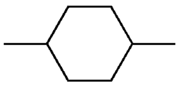 ,  or

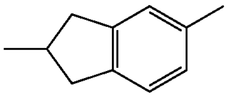 , wherein one or at least two —$CH_2$— in

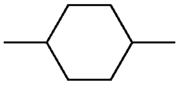 and 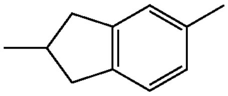

can be replaced by —O—, one or at least two single bond in the rings can be replaced by double bond, wherein one or at least two —H on

and
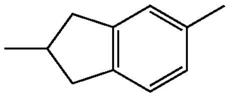

can each be independently replaced by —F, —Cl, —CN, $—CH_3$ or $—OCH_3$, one or at least two —CH= in the rings can each be independently replaced by —N=;

ring

, ring

, ring

and ring

each independently represents

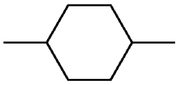
, one or at least two $—CH_2—$ in

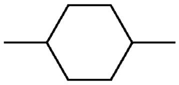

can be replaced by —O—, one or at least two single bond in the rings can be replaced by double bond, and at least one single bond in the rings in at least one of ring

and ring

is replaced by double bond, at least one single bond in the rings in at least one of ring

and ring

is replaced by double bond;

$L_1$ and $L_2$ each independently represents halogen atom;

$X_1$ and $X_2$ each independently represents —O— or —S—;

$Z_1$ represents single bond, —CO—O—, —O—CO—, $—CH_2O—$, $—OCH_2—$, —CH=CH—, —C≡C—, $—CH_2CH_2—$, $—CF_2CF_2—$, $—(CH_2)_4—$, $—CF_2O—$ or $—OCF_2—$;

$n_1$ represents 0, 1 or 2, when $n_1$ represents 2, ring

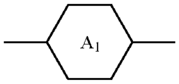

can be the same or different, $Z_1$ can be the same or different; and $n_2$ represents 0, 1, 2, 3 or 4.

Via designing the specific constitution of the liquid crystal composition and the structures of the compounds, and further using at least one compound of general formula I and at least one compound of general formula II in conjunction, the liquid crystal composition obtained in the present invention has a higher $K_{ave}$ value and a higher $\varepsilon_{\perp}/\Delta\varepsilon$ ratio, and has higher transmittance and contrast rate, and a remarkable low-temperature storage performance at the same time.

In the present invention, the halogen atom includes fluorine atom, chlorine atom, bromine atom and iodine atom (the same below).

The followings are preferred technical solutions of the present invention, but not used as limitations of the technical solutions provided by the present invention. The objections and beneficial effects of the present invention can be better achieved and realized via the following preferred technical solutions.

In some embodiments of the present invention, the compound of general formula I is any one or the combination of at least two of the compounds with the following structures:

I-1

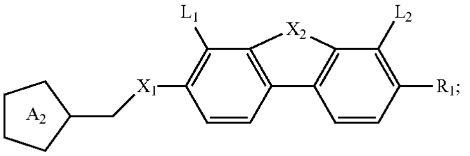

I-2

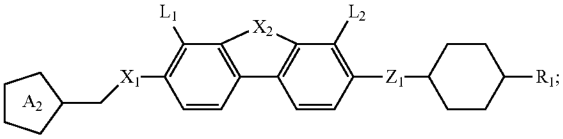

I-3

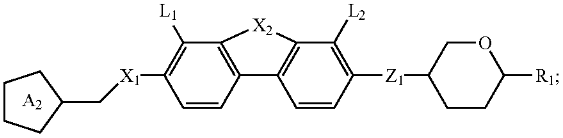

I-4

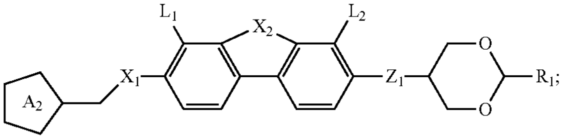

I-5

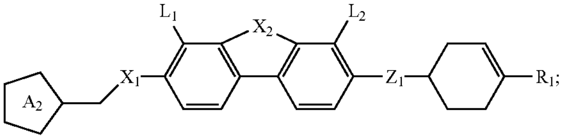

I-6

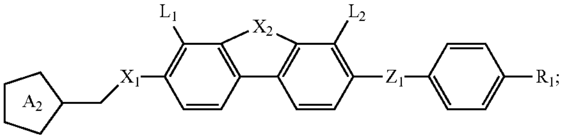

I-7

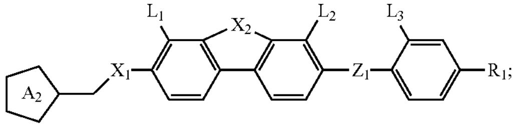

and

I-8

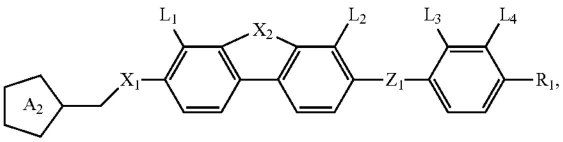

wherein, ring

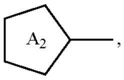

$X_1$, $X_2$, $L_1$, $L_2$, $Z_1$, and $R_1$ have the same protection scopes as aforesaid.

In some embodiments of the present invention, ring

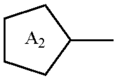

represents

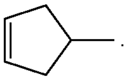

In some embodiments of the present invention, the compound of general formula I is the compound with the general formula I-1.

In some embodiments of the present invention, in the liquid crystal composition, percentage by weight of the compound of general formula I is 0.1%-20%, for example, it can be 0.1%, 1%, 2%, 3%, 4%, 5%, 6%, 7%, 8%, 10%, 12%, 14%, 15%, 16%, 17%, 18%, 19%, 20% or the like, further preferably, 1%-10%.

In some embodiments of the present invention, it is preferred to adjust the content of the compound of general formula I, such that the liquid crystal composition comprising the same has a higher $K_{ave}$ value and a higher $\varepsilon_{\perp}/\Delta\varepsilon$ ratio, and has higher transmittance and contrast rate, and a remarkable low-temperature storage performance at the same time.

In some embodiments of the present invention, the compound of general formula II-1 is any one or the combination of at least two of the compounds with the following structures:

II-1-1

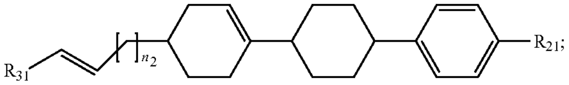

II-1-2

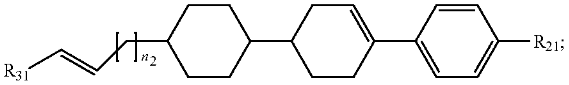

II-1-3

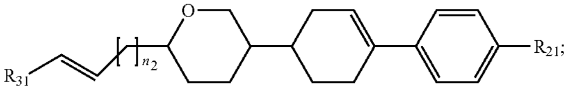

II-1-4

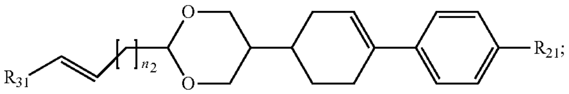

II-1-5

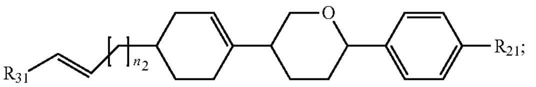

and

II-1-6

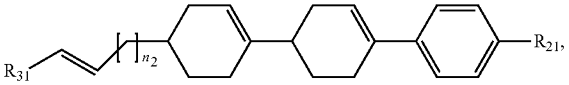

wherein, $R_{21}$, $R_{31}$ and $n_2$ have the same protection scopes as aforesaid.

In some embodiments of the present invention, in the liquid crystal composition, percentage by weight of the compound of general formula II-1 is 0.1%-20%, for example, it can be 0.1%, 1%, 2%, 3%, 4%, 5%, 6%, 7%, 8%, 10%, 12%, 14%, 15%, 16%, 17%, 18%, 19%, 20% or the like, further preferably, 1%-10%.

In some embodiments of the present invention, the compound of general formula II-2 is any one or the combination of at least two of the compounds with the following structures:

II-2-1

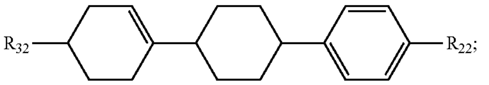

II-2-2

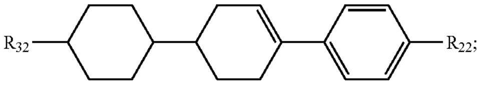

II-2-3

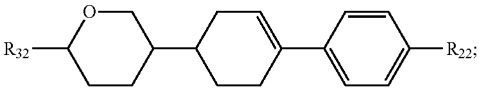

II-2-4

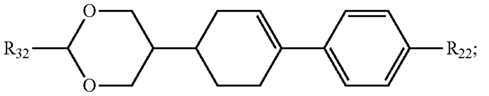

II-2-5

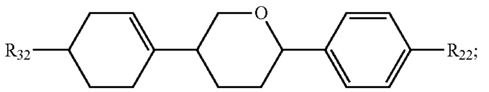 and

II-2-6

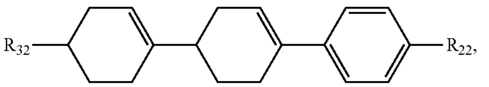

wherein, $R_{22}$ and $R_{32}$ have the same protection scopes as aforesaid.

In some embodiments of the present invention, in the liquid crystal composition, percentage by weight of the compound of general formula II-2 is 0.1%-20%, for example, it can be 0.1%, 1%, 2%, 3%, 4%, 5%, 6%, 7%, 8%, 10%, 12%, 14%, 15%, 16%, 17%, 18%, 19%, 20% or the like, further preferably, 1%-10%.

In some embodiments of the present invention, the liquid crystal composition comprises at least one of the compounds of general formula II-1 and general formula II-2.

In some embodiments of the present invention, in the liquid crystal composition, sum of percentages by weight of the compounds of general formula II-1 and general formula II-2 is 0.1%-30%, for example, it can be 0.1%, 1%, 2%, 3%, 4%, 5%, 6%, 7%, 8%, 10%, 12%, 14%, 15%, 16%, 17%, 18%, 19%, 20%, 21%, 22%, 23%, 24%, 25%, 26%, 27%, 28%, 29%, 30% or the like, further preferably, 1%-15%

In some embodiments of the present invention, it is preferred to adjust the content of the compound of general formula II-1 and/or the compound of general formula II-2, such that the liquid crystal composition comprising the same has a higher $K_{ave}$ value and a higher $\varepsilon_{\perp}/\Delta\varepsilon$ ratio, and has higher transmittance and contrast rate, and a remarkable low-temperature storage performance at the same time.

In some embodiments of the present invention, the liquid crystal composition further comprises at least one compound of general formula III:

III

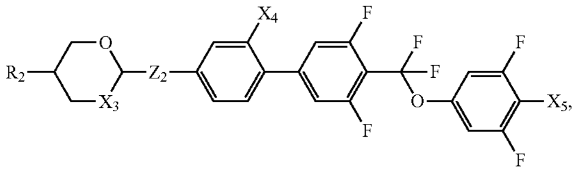

wherein, $R_2$ represents $C_{1-12}$ (for example, it can be $C_1$, $C_2$, $C_3$, $C_4$, $C_5$, $C_6$, $C_7$, $C_8$, $C_9$, $C_{10}$, $C_{11}$ or $C_{12}$) linear alkyl, $C_{3-12}$ (for example, it can be $C_3$, $C_4$, $C_5$, $C_6$, $C_7$, $C_8$, $C_9$, $C_{10}$, $C_{11}$ or $C_{12}$) branched alkyl,

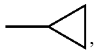, 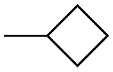 or 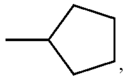, wherein one or at least two nonadjacent —$CH_2$— in the $C_{1-12}$ linear alkyl, $C_{3-12}$ branched alkyl,

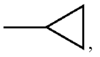, 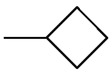 or 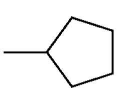

can each be independently replaced by —CH═CH—, —C≡C—, —O—, —CO—, —CO—O— or —O—CO—, and one or at least two —H in the $C_{1-12}$ linear alkyl and $C_{3-12}$ branched alkyl can each be independently replaced by —F or —Cl;

$Z_2$ represents single bond, —$CH_2CH_2$—, —$CF_2CF_2$—, —CO—O—, —O—CO—, —O—CO—O—, —CH—CH—, —CF═CF—, —$CH_2O$— or —$OCH_2$—;

$X_3$ represents —O— or —$CH_2$—;

$X_4$ represents —F or —H; and $X_5$ represents halogen atom, $C_{1-5}$ (for example, it can be $C_1$, $C_2$, $C_3$, $C_4$ or $C_5$) halogenated alkyl, $C_{1-5}$ (for example, it can be $C_1$, $C_2$, $C_3$, $C_4$ or $C_5$) halogenated alkoxy, $C_{2-5}$ (for example, it can be $C_2$, $C_3$, $C_4$ or $C_5$) halogenated alkenyl, or $C_{2-5}$ (for example, it can be $C_2$, $C_3$, $C_4$ or $C_5$) halogenated alkenoxy.

In some embodiments of the present invention, the liquid crystal composition comprises at least one (for example, it can be two, three, four, five, or six) compound of general formula III wherein $Z_2$ represents single bond.

In some embodiments of the present invention, the liquid crystal composition comprises at least one (for example, it can be two, or three) compound of general formula III wherein $Z_2$ represents —$CH_2CH_2$—.

In some embodiments of the present invention, the liquid crystal composition comprises at least one (for example, it can be two, three, four, five, or six) compound of general formula III wherein Z represents single bond, and at least one (for example, it can be two, or three) compound of general formula III wherein $Z_2$ represents —$CH_2CH_2$—.

In some embodiments of the present invention, in the liquid crystal composition, percentage by weight of the compound of general formula III is 0.1%-20%, for example, it can be 0.1%, 1%, 2%, 3%, 4%, 5%, 6%, 7%, 8%, 10%, 12%, 14%, 15%, 16%, 17%, 18%, 19%, 20% or the like, further preferably, 5%-15%.

In some embodiments of the present invention, it is preferred to adjust the content of the compound of general formula III, such that the liquid crystal composition comprising the same has a higher $K_{ave}$ value and a higher $\varepsilon_{\perp}/\Delta\varepsilon$ ratio, and has higher transmittance and contrast rate, and a remarkable low-temperature storage performance at the same time.

In some embodiments of the present invention, the liquid crystal composition further comprises at least one compound of general formula N:

N

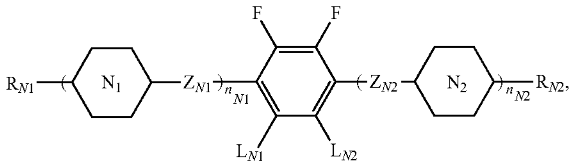

wherein, $R_{N1}$ and $R_{N2}$ each independently represents $C_{1-12}$ (for example, it can be $C_1$, $C_2$, $C_3$, $C_4$, $C_5$, $C_6$, $C_7$, $C_8$, $C_9$, $C_{10}$, $C_{11}$ or $C_{12}$) linear alkyl, $C_{3-12}$ (for example, it can be $C_3$, $C_4$, $C_5$, $C_6$, $C_7$, $C_8$, $C_9$, $C_{10}$, $C_{11}$ or $C_{12}$) branched alkyl,

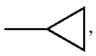, 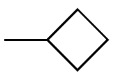 or 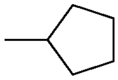, wherein one or at least two nonadjacent —$CH_2$— in the $C_{1-12}$ linear alkyl and $C_{3-12}$ branched alkyl can each be independently replaced by —CH═CH—, —C≡C—, —O—, —CO—, —CO—O— or —O—CO—;

ring

and ring

each independently represents

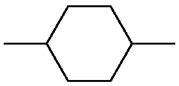 or 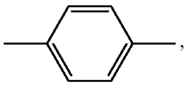, wherein one or at least two —$CH_2$— in

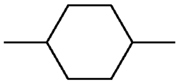

can be replaced by —O—, one or at least two single bond in the rings can be replaced by double bond; one or at least two —H on

can each be independently replaced by —F, —Cl or —CN, one or at least two —CH═ in the rings can be replaced by —N═;

$Z_{N1}$ and $Z_{N2}$ each independently represents single bond, —CO—O—, —O—CO—, —$CH_2O$—, —$OCH_2$—, —CH═CH—, —C≡C—, —$CH_2CH_2$—, —$CF_2CF_2$—, —$(CH_2)_4$—, —$CF_2O$— or —$OCF_2$—;

$L_{N1}$ and $L_{N2}$ each independently represents —H, $C_{1-3}$ (for example, it can be $C_1$, $C_2$ or $C_3$) alkyl, or halogen atom; and $n_{N1}$ represents 0, 1, 2 or 3, $n_{N2}$ represents 0 or 1, and $0 \le n_{N1}+n_{N2} \le 3$, wherein when $n_{N1}$ represents 2 or 3, ring

can be the same or different, and $Z_{N1}$ can be the same or different.

In some embodiments of the present invention, the compound of general formula N is any one or the combination of at least two of the compounds with the following structures:

N-1

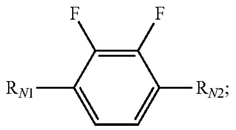

N-2

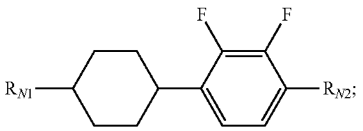

N-3

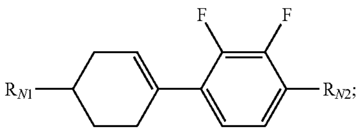

N-4

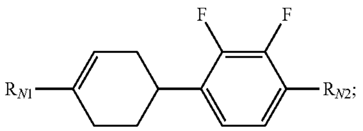

-continued
N-5
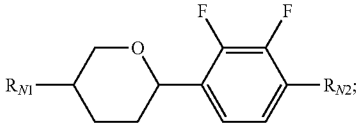
N-6
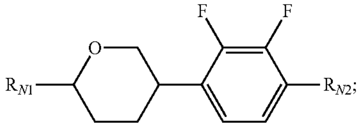
N-7
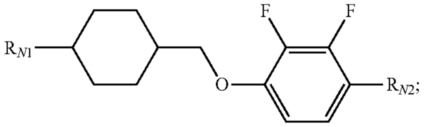
N-8
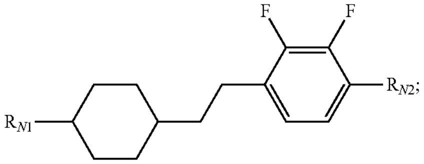
N-9
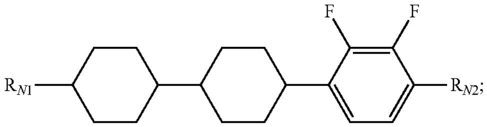
N-10
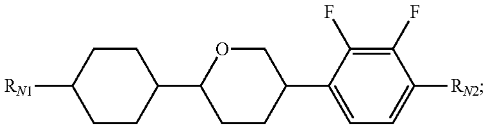
N-11
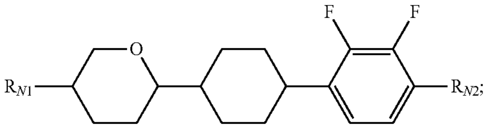
N-12
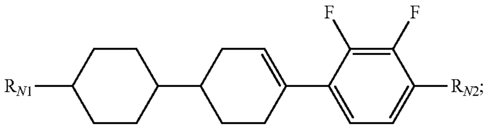
N-13
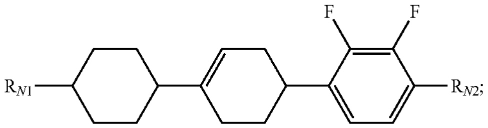
N-14
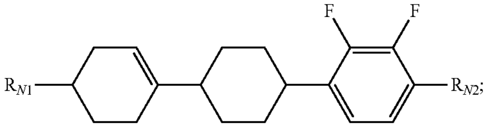
N-15
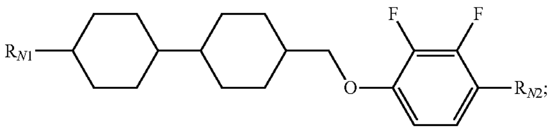
-continued
N-16
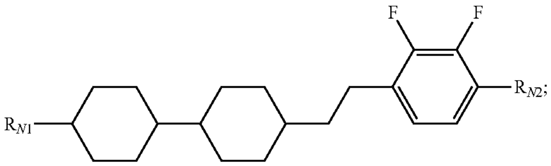
N-17
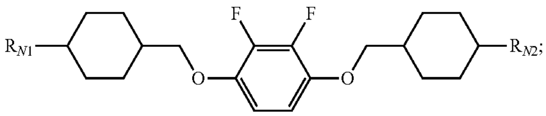
N-18
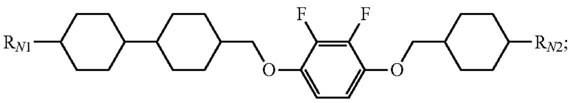
N-19
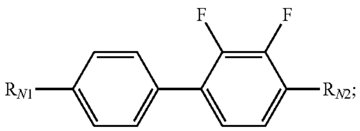
N-20
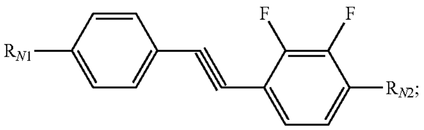
N-21
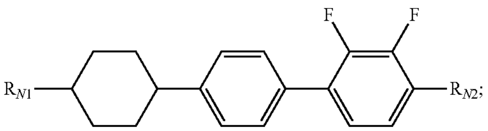
N-22
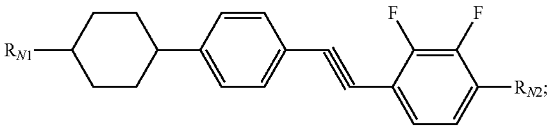
N-23
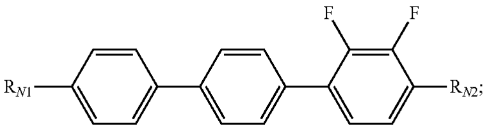
N-24
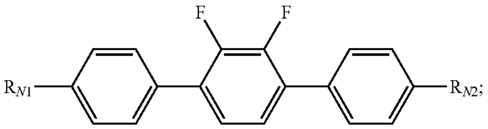
N-25
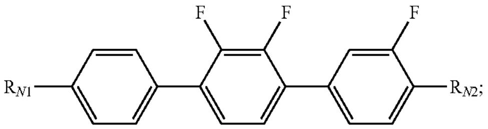
N-26
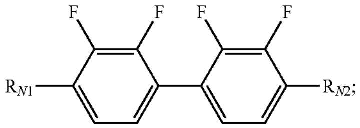

-continued

N-27

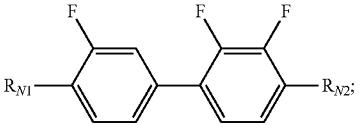

N-28

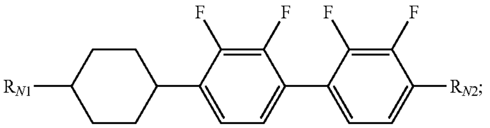

N-29

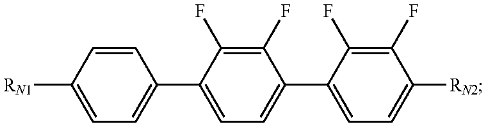

N-30

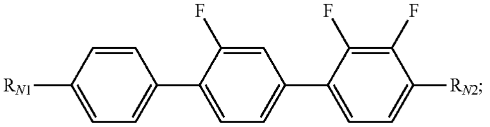

N-31

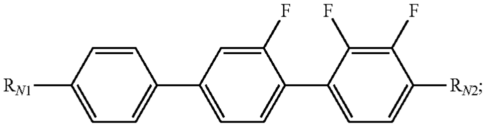

N-32

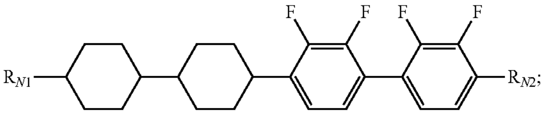

N-33

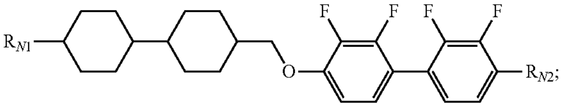

N-34

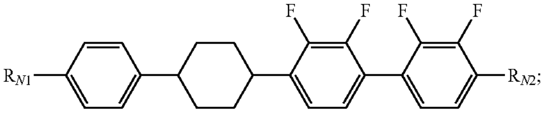

N-35

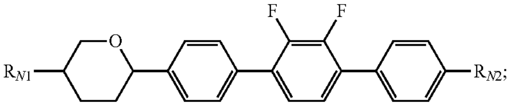

and

N-36

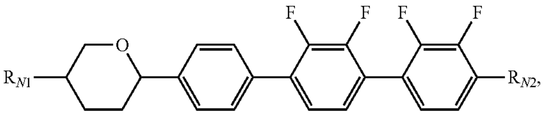

wherein, $R_{N1}$ and $R_{N2}$ have the same protection scopes as aforesaid.

In some embodiments of the present invention, the compound of general formula N is selected from a group consisting of the compound of general formula N-12, the compound of general formula N-19, and the compound of general formula N-21.

In some embodiments of the present invention, in the liquid crystal composition, percentage by weight of the compound of general formula N is 0.1%-20%, for example, it can be 0.1%, 1%, 2%, 3%, 4%, 5%, 6%, 7%, 8%, 10%, 12%, 14%, 15%, 16%, 17%, 18%, 19%, 20% or the like, further preferably, 2%-15%.

In some embodiments of the present invention, the liquid crystal composition further comprises a group of compounds consisting of at least one compound of general formula A-1 and at least one compound of general formula A-2:

A-1

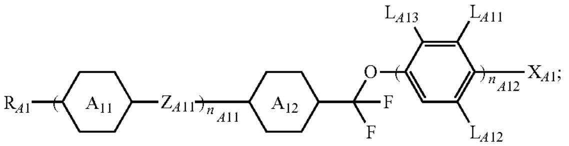

A-2

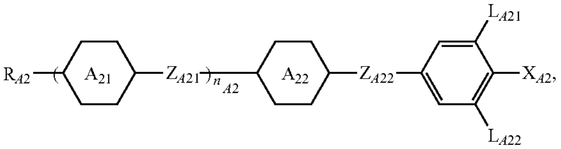

wherein, $R_{A1}$ and $R_{A2}$ each independently represents $C_{1-12}$ (for example, it can be $C_1$, $C_2$, $C_3$, $C_4$, $C_5$, $C_6$, $C_7$, $C_8$, $C_9$, $C_{10}$, $C_{11}$ or $C_{12}$) linear alkyl, $C_{3-12}$ (for example, it can be $C_3$, $C_4$, $C_5$, $C_6$, $C_7$, $C_8$, $C_9$, $C_{10}$, $C_{11}$ or $C_{12}$) branched alkyl,

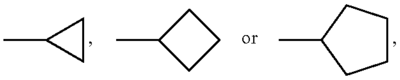

wherein, one or at least two nonadjacent —$CH_2$— in the $C_{1-12}$ linear alkyl, $C_{3-12}$ branched alkyl,

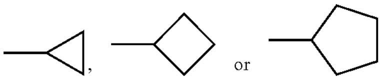

can each be independently replaced by —CH═CH—, —C≡C—, —O—, —CO—, —CO—O— or —O—CO—, and one or at least two —H in the $C_{1-12}$ linear alkyl and $C_{3-12}$ branched alkyl can each be independently replaced by —F or —Cl;

ring

represents

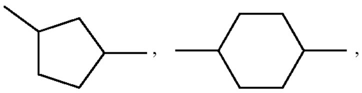

-continued

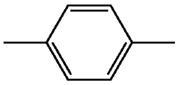 or 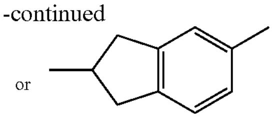, wherein one or at least two —$CH_2$— in

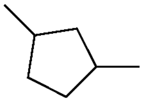 and 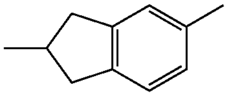

can be replaced by —O—; one or at least two single bond in the rings in

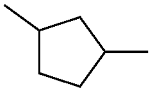, 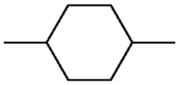 and 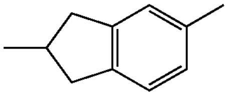

can be replaced by double bond; one or at least two —H on

 and 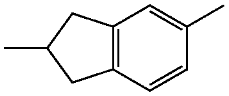

can each be independently replaced by —F, —Cl or —CN, one or at least two —CH═ in the rings can be replaced by —N═;

ring

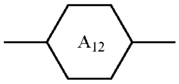

represents

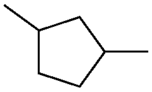, 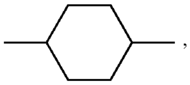,

 or 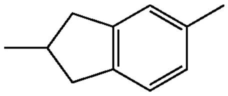, wherein one or at least two —$CH_2$— in

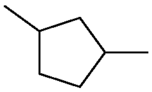, 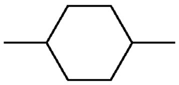 and

-continued

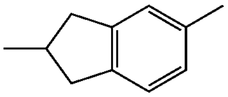

can be replaced by —O—, one or at least two single bond in the rings can be replaced by double bond; one or at least two —H on

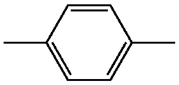 and 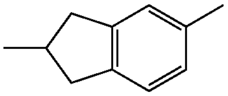

can each be independently replaced by —F, —Cl or —CN, one or at least two —CH═ in the rings can be replaced by —N═;

ring

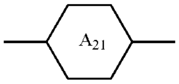 and 

each independently represents

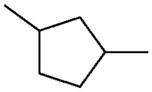, 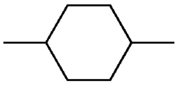, 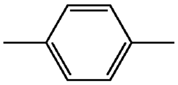 or

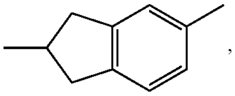, wherein one or at least two —$CH_2$— in

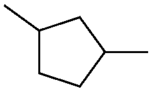, 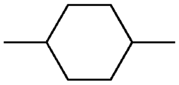 and

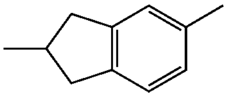

can be replaced by —O—, one or at least two single bond in the rings in

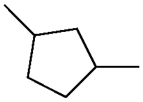 and 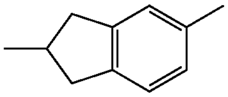

can be replaced by double bond; one or at least two —H on

and

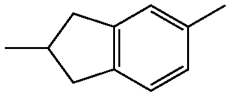

can each be independently replaced by —F, —Cl or —CN, one or at least two —CH= in the rings can be replaced by —N=;

$Z_{A11}$, $Z_{A21}$ and $Z_{A22}$ each independently represents single bond, $—CH_2CH_2—$, $—CF_2CF_2—$, —CO—O—, —O—CO—, —O—CO—O—, —CH=CH—, —CF=CF—, $—CH_2O—$ or $—OCH_2—$;

$L_{A11}$, $L_{A12}$, $L_{A13}$, $L_{A21}$ and $L_{A22}$ each independently represents —H, $C_{1-3}$ (for example, it can be $C_1$, $C_2$ or $C_3$) alkyl or halogen atom;

$X_{A1}$ and $X_{A2}$ each independently represents halogen atom, $C_{1-5}$ (for example, it can be $C_1$, $C_2$, $C_3$, $C_4$ or $C_5$) halogenated alkyl, $C_{1-5}$ (for example, it can be $C_1$, $C_2$, $C_3$, $C_4$ or $C_5$) halogenated alkoxy, $C_{2-5}$ (for example, it can be $C_2$, $C_3$, $C_4$ or $C_5$) halogenated alkenyl or $C_{2-5}$ (for example, it can be $C_2$, $C_3$, $C_4$ or $C_5$) halogenated alkenoxy;

$n_{A11}$ represents 0, 1, 2 or 3, wherein when nan represents 2 or 3, ring

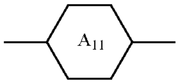

can be same or different, and $Z_{A11}$ can be same or different;

$n_{A12}$ represents 1 or 2, wherein when $n_{A12}$ represents 2, ring

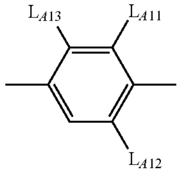

can be same or different; and $n_{A2}$ represents 0, 1, 2 or 3, wherein when $n_{A2}$ represents 2 or 3, ring

can be same or different, and $Z_{A21}$ can be the same or different.

In some embodiments of the present invention, the compound of general formula A-1 is any one or the combination of at least two of the compounds with the following structures:

A-1-1

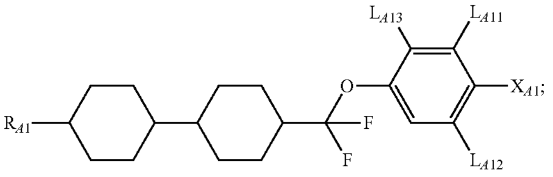

A-1-2

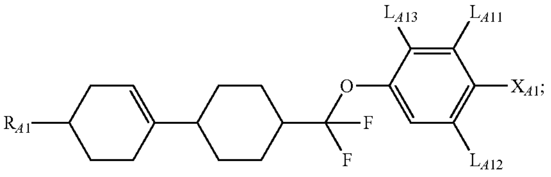

A-1-3

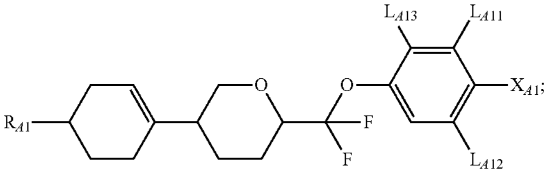

A-1-4

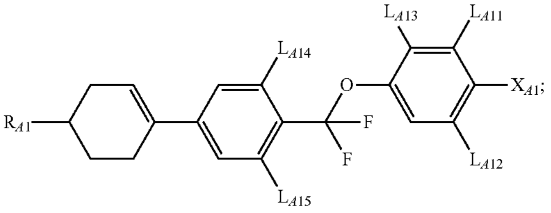

A-1-5

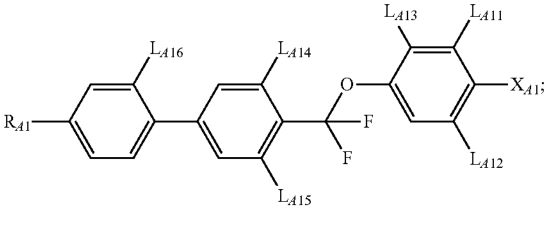

A-1-6

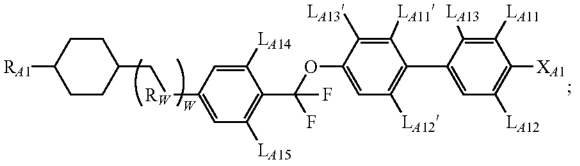

-continued

A-1-7

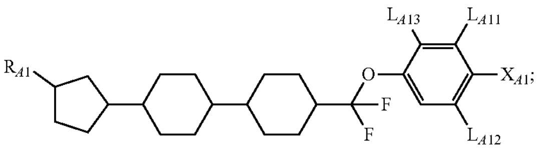

A-1-8

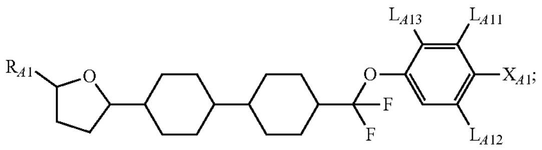

A-1-9

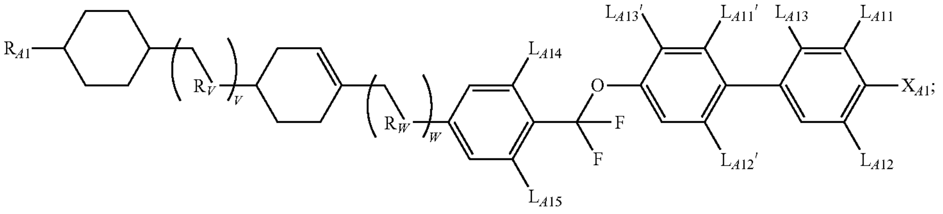

A-1-10

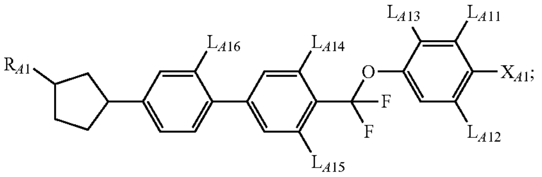

A-1-11

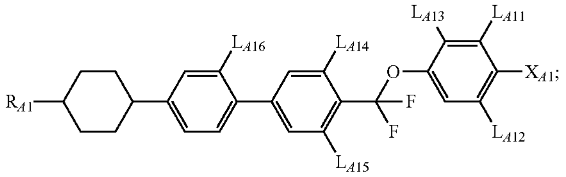

A-1-12

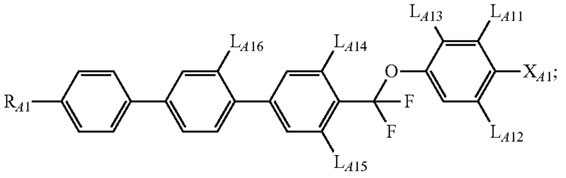

A-1-13

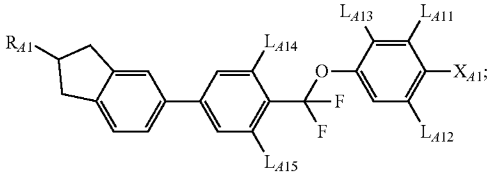

A-1-14

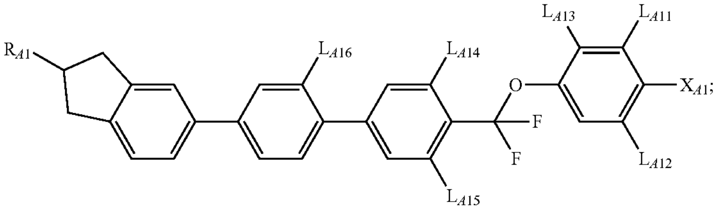

and

A-1-15

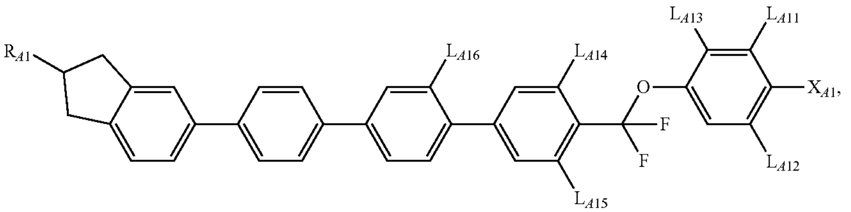

wherein, $R_{A1}$ represents $C_{1-8}$ (for example, it can be $C_1$, $C_2$, $C_3$, $C_4$, $C_5$, $C_6$, $C_7$ or $C_8$) linear alkyl, $C_{3-8}$ (for example, it can be $C_3$, $C_4$, $C_5$, $C_6$, $C_7$ or $C_8$) branched alkyl,

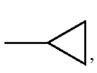, 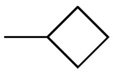 or 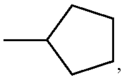, wherein one or at least two nonadjacent —$CH_2$— in the $C_{1-8}$ linear alkyl and $C_{3-8}$ branched alkyl can each be independently replaced by —CH═CH—, —C≡C—, —O—, —CO—, —CO—O— or —O—CO—, and one or at least two —H in the $C_{1-8}$ linear alkyl and $C_{3-8}$ branched alkyl can each be independently replaced by —F or —Cl;

$R_v$ and $R_w$ each independently represents —$CH_2$— and —O—;

v and w each independently represents 0 or 1;

$L_{A11}$, $L_{A12}$, $L_{A11}'$, $L_{A12}'$, $L_{A14}$, $L_{A15}$ and $L_{A16}$ each independently represents —H or —F;

$L_{A13}$ and $L_{A13}'$ each independently represents —H or —$CH_3$; and $X_{A1}$ represents —F, —$CF_3$ or —$OCF_3$.

In some embodiments of the present invention, in the liquid crystal composition, percentage by weight of the compound of general formula A-1 is 0.1%-20%, for example, it can be 0.1%, 1%, 4%, 6%, 8%, 10%, 12%, 14%, 16%, 18%, 20% or the like, further preferably, 4%-15%.

In some embodiments of the present invention, via controlling the content of the compound of general formula A-I into a certain range, the obtained liquid crystal composition has an appropriate optical anisotropy, an appropriate clearing point, an appropriate absolute value of dielectric anisotropy, a larger $K_{ave}$ value, a smaller rotational viscosity, a shorter response time, a higher transmittance, a higher contrast rate and a longer low-temperature storage time.

In some embodiments of the present invention, the compound of general formula A-2 is any one or the combination of at least two of the compounds with the following structures:

A-2-1

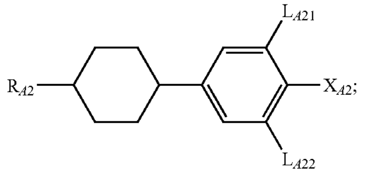

A-2-2

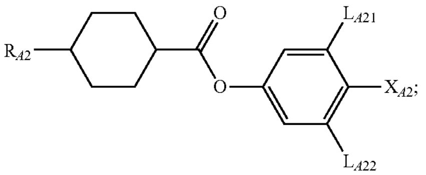

A-2-3

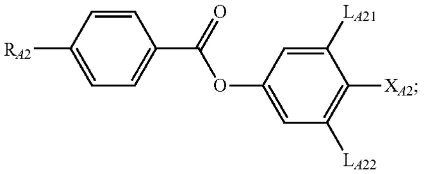

A-2-4

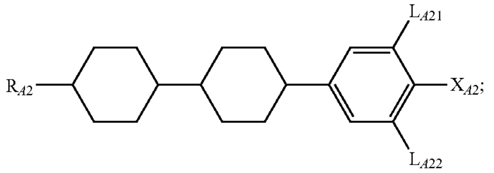

A-2-5

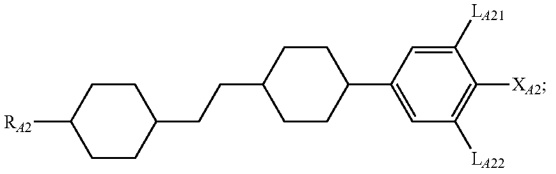

A-2-6

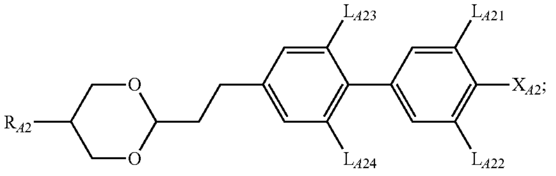

-continued

A-2-7

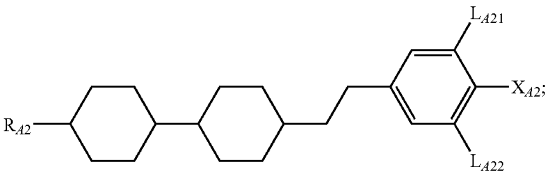

A-2-8

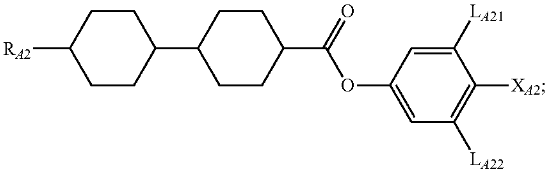

A-2-9

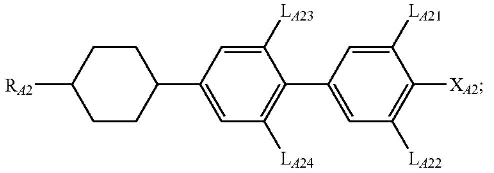

A-2-10

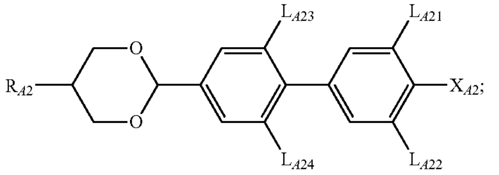

A-2-11

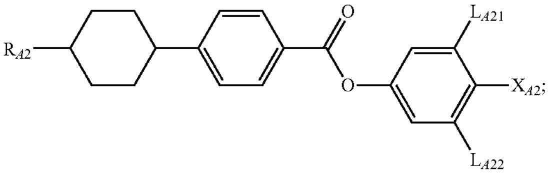

A-2-12

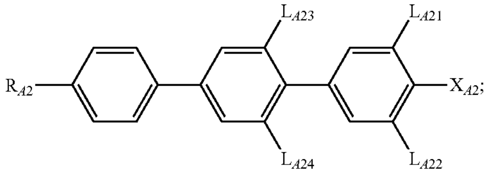

A-2-13

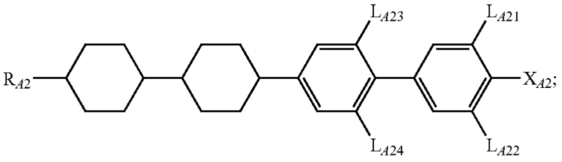

A-2-14

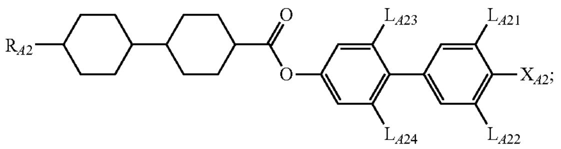

-continued

A-2-15

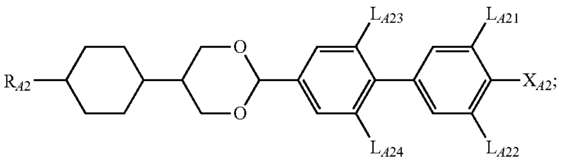

A-2-16

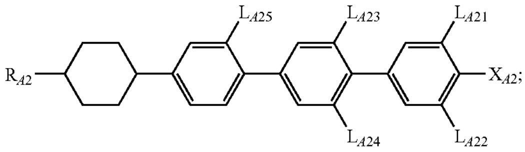 and

A-2-17

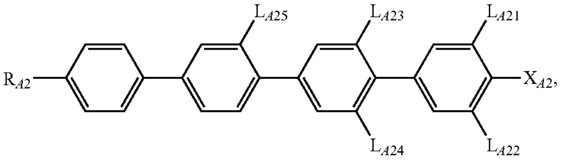

wherein, $R_{A2}$ represents $C_{1-8}$ (for example, it can be $C_1$, $C_2$, $C_3$, $C_4$, $C_5$, $C_6$, $C_7$ or $C_8$) linear alkyl, $C_{3-8}$ (for example, it can be $C_3$, $C_4$, $C_5$, $C_6$, $C_7$ or $C_8$) branched alkyl, wherein one or at least two nonadjacent —$CH_2$— in the $C_{1-8}$ linear alkyl and $C_{3-8}$ branched alkyl can each be independently replaced by —CH═CH—, —C≡C—, —O—, —CO—, —CO—O— or —O—CO—, and one or at least two —H in the $C_{1-8}$ linear alkyl and $C_{3-8}$ branched alkyl can each be independently replaced by —F or —Cl;

$L_{A21}$, $L_{A22}$, $L_{A23}$, $L_{A24}$ and $L_{A25}$ each independently represents —H or —F; and $X_{A2}$ represents —F, —$CF_3$, —$OCF_3$ or —$CH_2CH_2CH$═$CF_2$.

In some embodiments of the present invention, in the liquid crystal composition, percentage by weight of the compound of general formula A-2 is 0.1%-20%, for example, it can be 0.1%, 1%, 4%, 6%, 8%, 10%, 12%, 14%, 16%, 18%, 20%, further preferably, 1%-10%.

In some embodiments of the present invention, via controlling the content of the compound of general formula A-2 into a certain range, the obtained liquid crystal composition has an appropriate optical anisotropy, an appropriate clearing point, an appropriate absolute value of dielectric anisotropy, a larger $K_{ave}$ value, a smaller rotational viscosity, a shorter response time, a higher transmittance, a higher contrast rate and a longer low-temperature storage time.

In some embodiments of the present invention, in the liquid crystal composition, sum of percentages by weight of the compound of general formula A-1 and the compound of general formula A-2 is 0.1%-30%, for example, 0.1%, 1%, 4%, 6%, 8%, 10%, 12%, 14%, 16%, 18%, 20%, 22%, 24%, 26%, 28%, 30% or the like.

In some embodiments of the present invention, the liquid crystal composition further comprises at least one compound of general formula M:

M

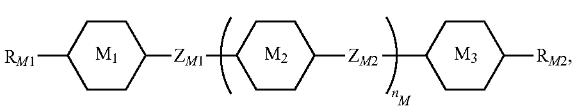

wherein, $R_{M1}$ and $R_{M2}$ each independently represents $C_{1-12}$ (for example, it can be $C_1$, $C_2$, $C_3$, $C_4$, $C_5$, $C_6$, $C_7$, $C_8$, $C_9$, $C_{10}$, $C_{11}$ or $C_{12}$) linear alkyl, $C_{3-12}$ (for example, it can be $C_3$, $C_4$, $C_5$, $C_6$, $C_7$, $C_8$, $C_9$, $C_{10}$, $C_{11}$ or $C_{12}$) branched alkyl,

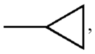, 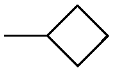 or 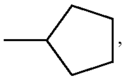, wherein one or at least two nonadjacent —$CH_2$— in the $C_{1-12}$ linear alkyl and $C_{3-12}$ branched alkyl can each be independently replaced by —CH═CH—, —C≡C—, —O—, —CO—, —CO—O— or —O—CO—;

ring

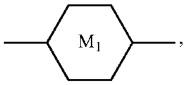, ring

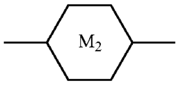

and ring

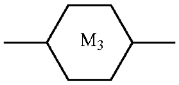

each independently represents

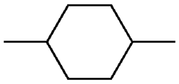 or 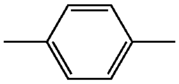, wherein one or at least two —$CH_2$— in

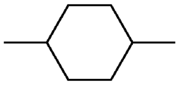

can be replaced by —O—; at most one —H on

can be replaced by halogen atom;

$Z_{M1}$ and $Z_{M2}$ each independently represents single bond, —CO—O—, —O—CO—, —CHO—, —$OCH_2$—, —C≡C—, —CH=CH—, —$CH_2CH_2$— or —$(CH_2)_4$—; and $n_M$ represents 0, 1 or 2, wherein when $n_M$ represents 2, ring

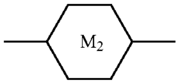

can be the same or different, $Z_{M2}$ can be the same or different.

In some embodiments of the present invention, the compound of general formula M is any one or the combination of at least two of the compounds with the following structures:

M-1

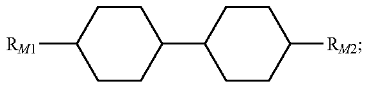

M-2

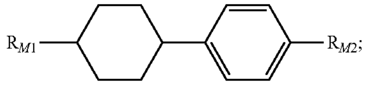

M-3

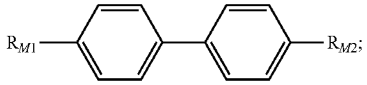

M-4

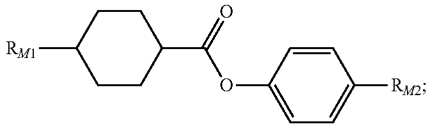

M-5

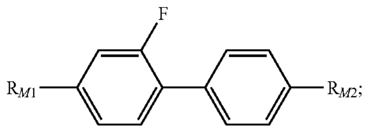

M-6

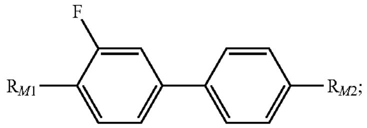

M-7

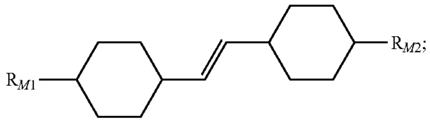

-continued

M-8

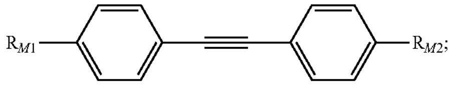

M-9

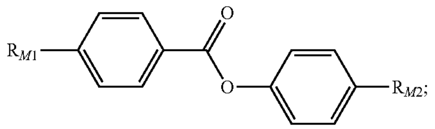

M-10

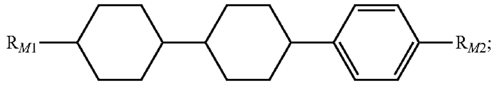

M-11

M-12

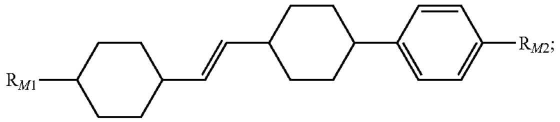

M-13

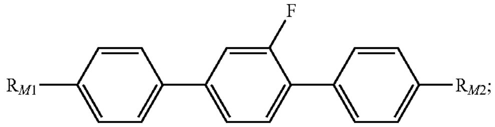

M-14

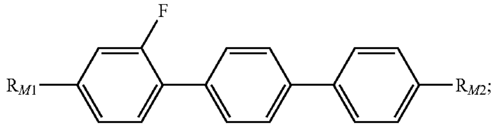

M-15

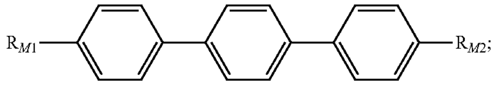

M-16

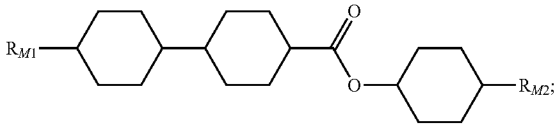

M-17

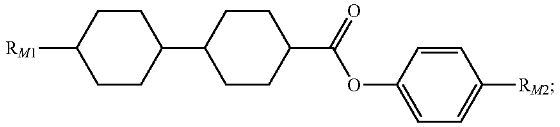

M-18

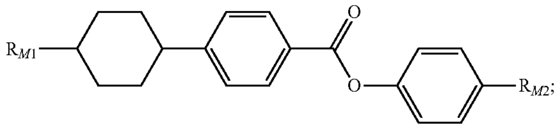

M-19

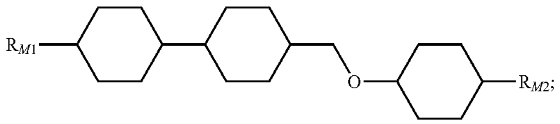

-continued

M-20

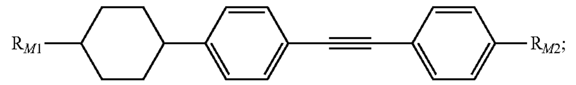

M-21

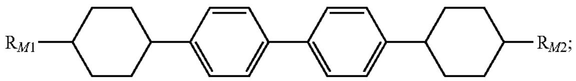

M-22

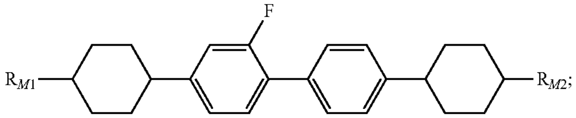

M-23

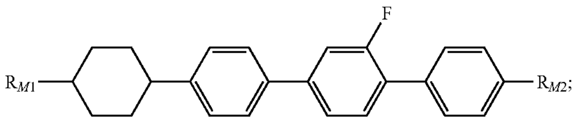

M-24

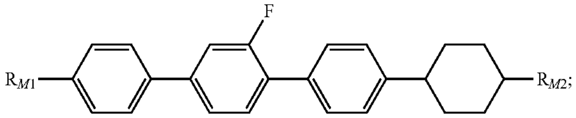

M-25

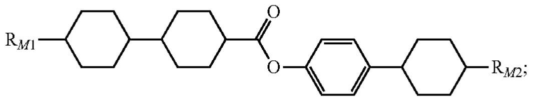

and

-continued

M-26

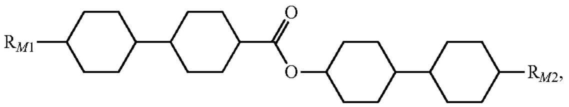

wherein, $R_{M1}$ and $R_{M2}$ have the same protection scopes as aforesaid.

In some embodiments of the present invention, the compound of general formula M is selected from a group consisting of the compound of general formula M-1, the compound of general formula M-2, the compound of general formula M-3, the compound of general formula M-10, the compound of general formula M-11, and the compound of general formula M-13.

In some embodiments of the present invention, in the liquid crystal composition, percentage by weight of the compound of general formula M is 20%-80%, for example, it can be 20%, 25%, 30%, 35%, 40%, 45%, 50%, 55%, 60%, 65%, 70%, 75%, 80% or the like, further preferably, 40%-68%.

In some embodiments of the present invention, the liquid crystal composition further comprises at least one additive.

The additives contain nematic liquid crystal, smectic liquid crystal, cholesteric liquid crystal, dopants, antioxidant, ultraviolet absorber, infrared absorber, polymerizable monomer or light stabilizer.

In some embodiments of the present invention, the dopant is selected from any one or the combination of at least two of the following compounds:

C 15

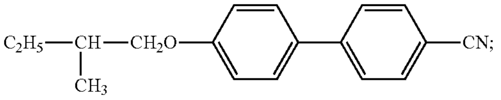

CB 15

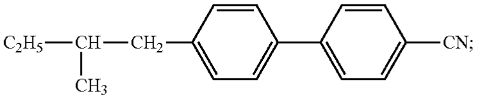

CM 21

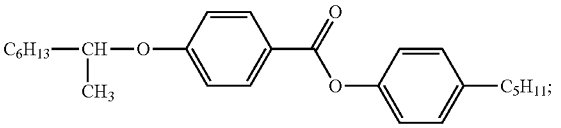

R/S-811

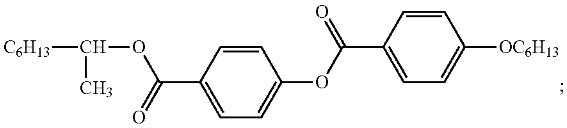

;

CM 44

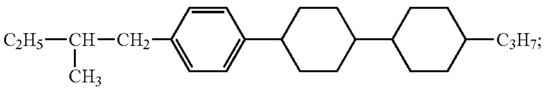

CM 45

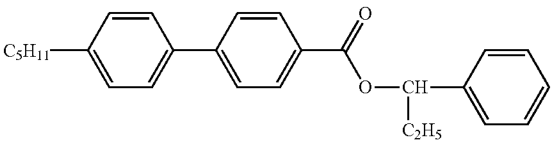

;

CM 47

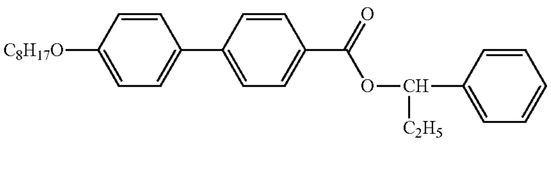

;

CN

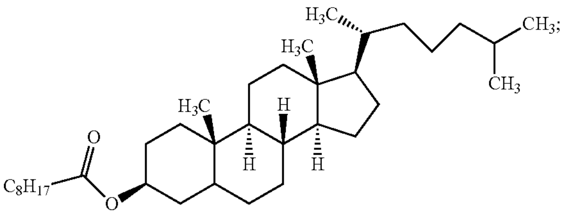

-continued

R/S-1011

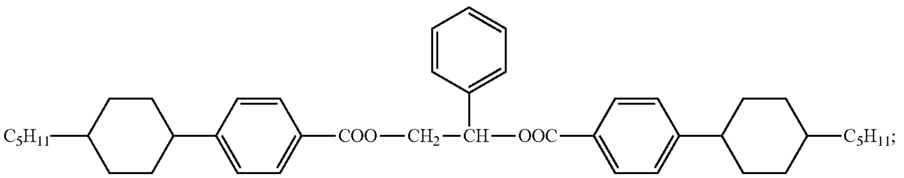

R/S-2011

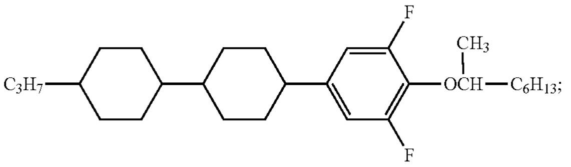

R/S-3011

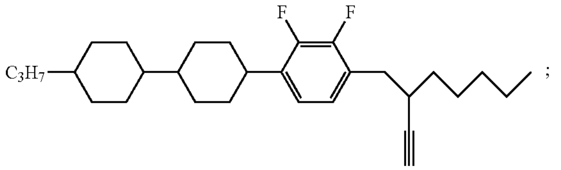

R/S-4011

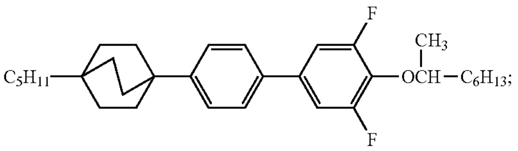

and

R/S-5011

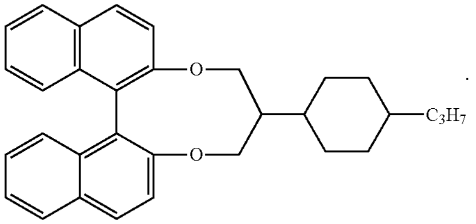

In some embodiments of the present invention, in the liquid crystal composition, percentage by weight of the dopant is 0%-5% for example, it can be 0%, 0.01%, 0.05%, 0.1%, 0.2%, 0.5%, 1%, 1.5%, 2%, 2.5%, 3%, 3.5%, 4%, 4.5%, 5%, or the like, further preferably, 0.01%-1%.

In some embodiments of the present invention, additives (such as antioxidant, light stabilizer, ultraviolet absorber and the like) are preferably to be the following compounds:

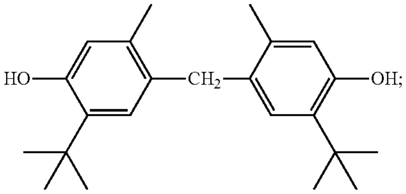

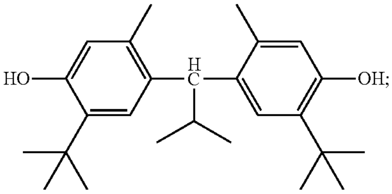

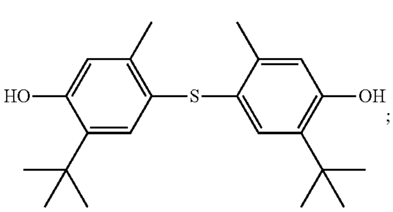

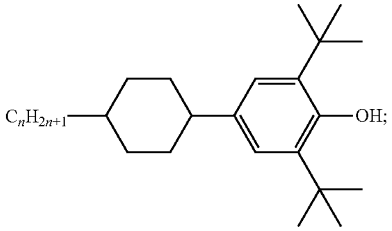

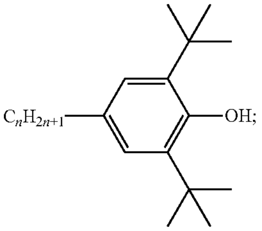

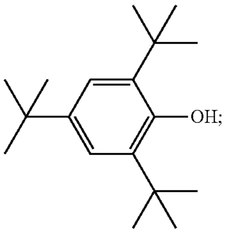

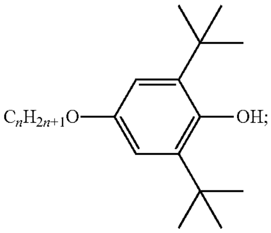

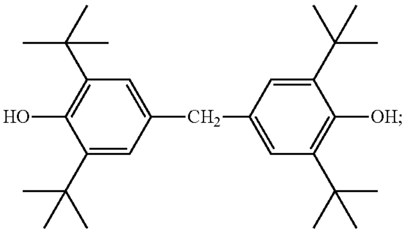

-continued
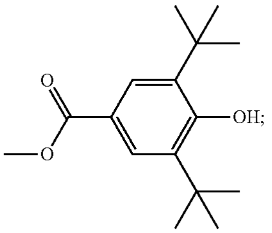
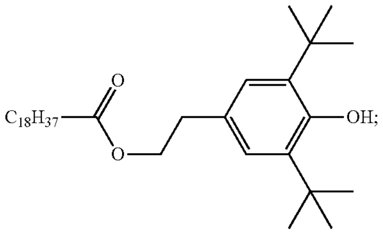
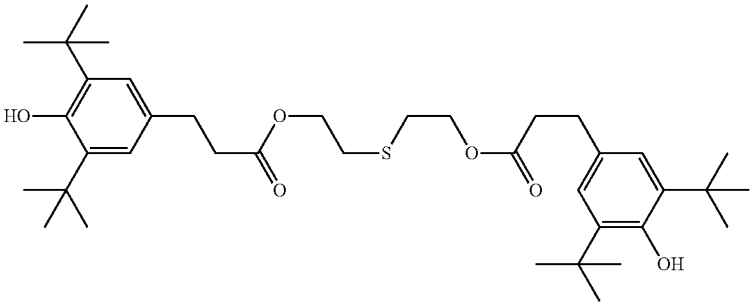
;
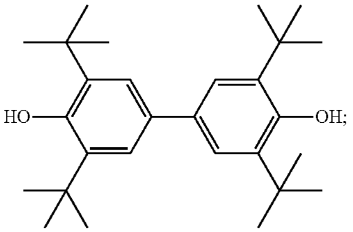
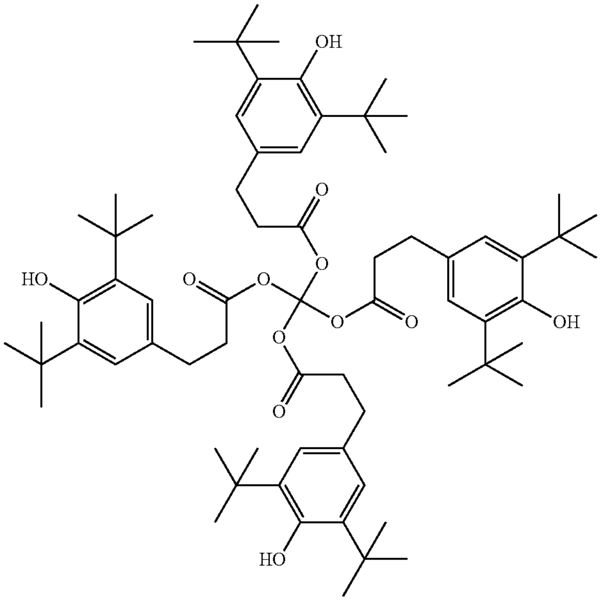
;
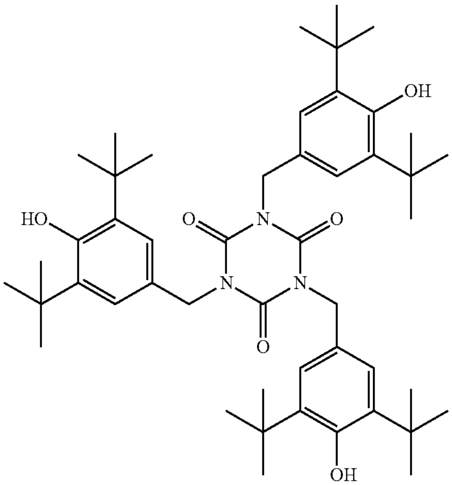
;
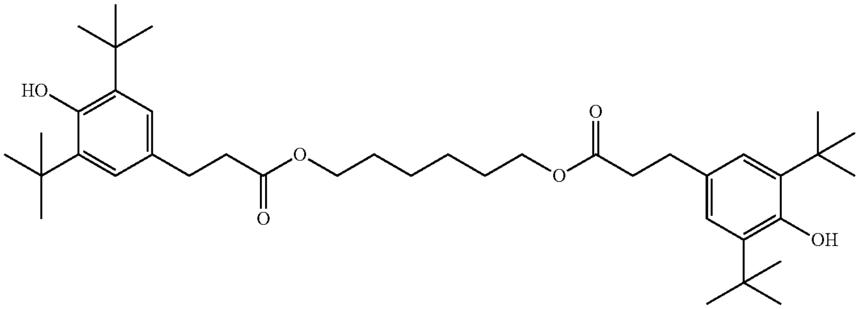
;
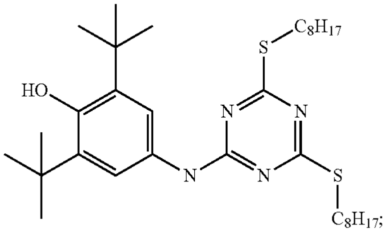

-continued
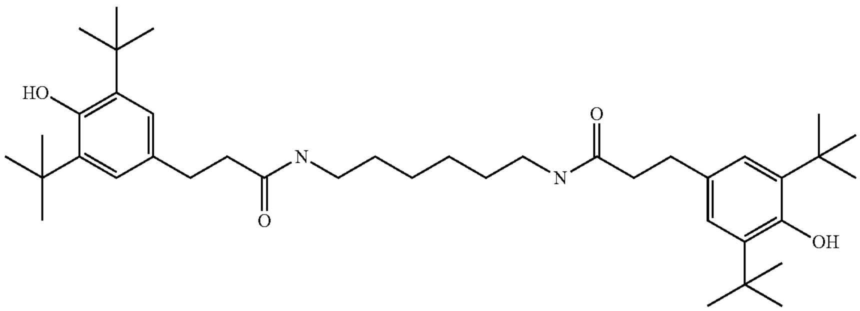 ;
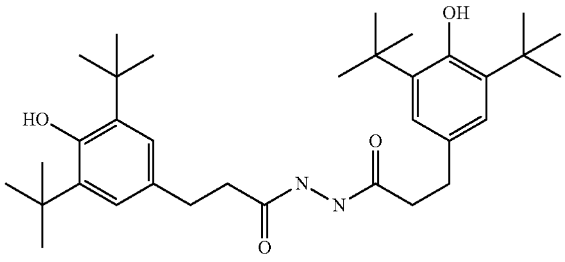 ; 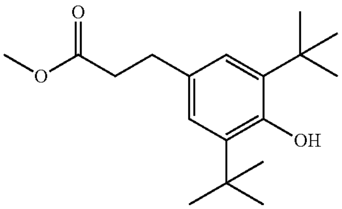 ;
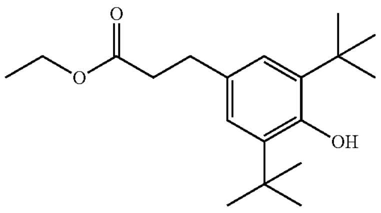 ; 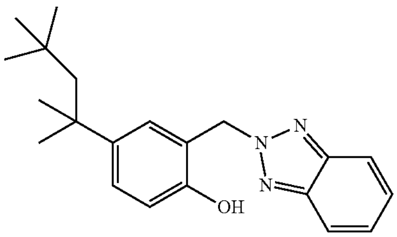 ; 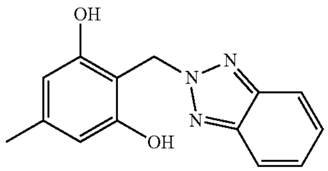 ;
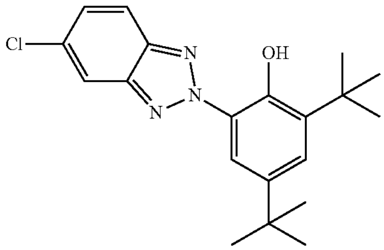 ; 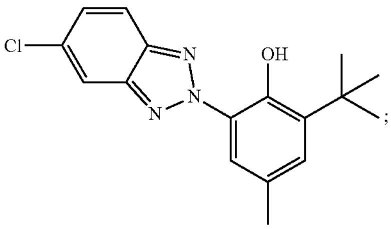 ; 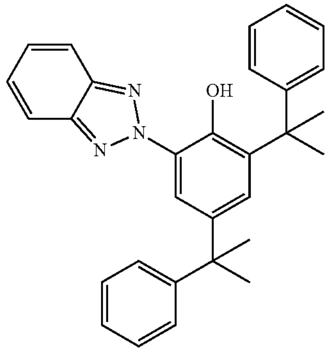 ;
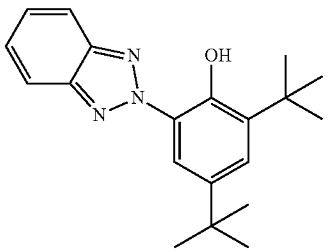 ; 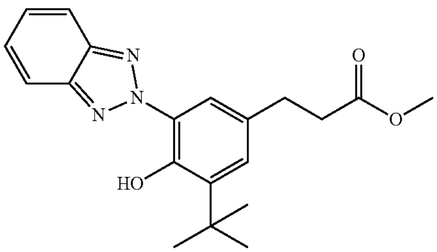 ;

-continued
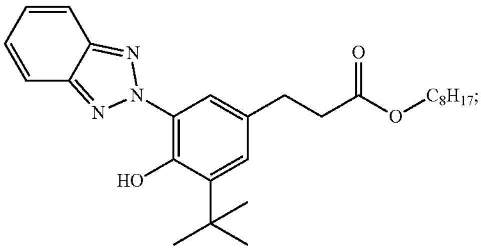
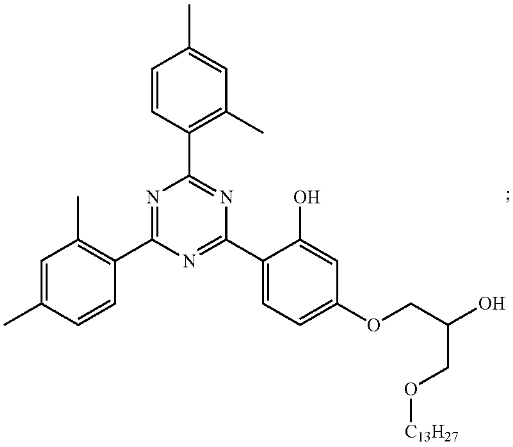
;
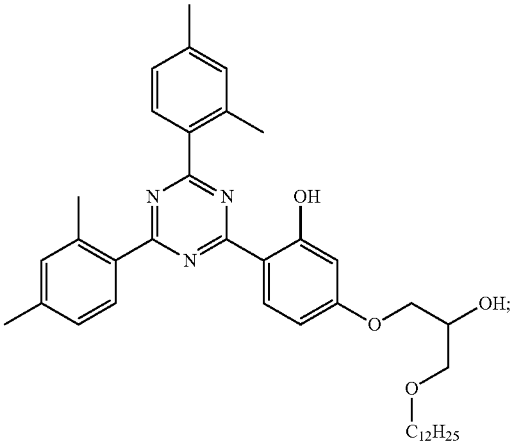
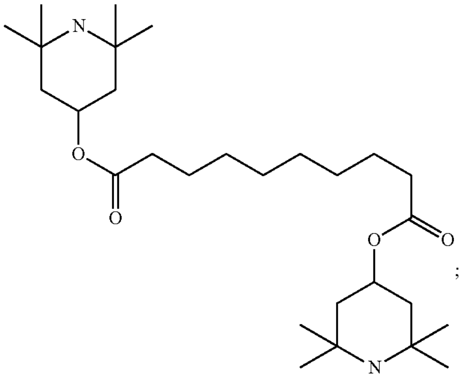
;
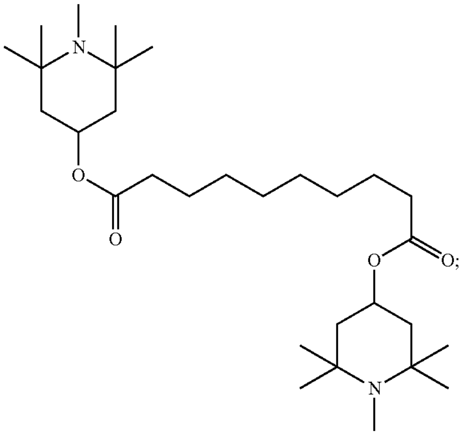
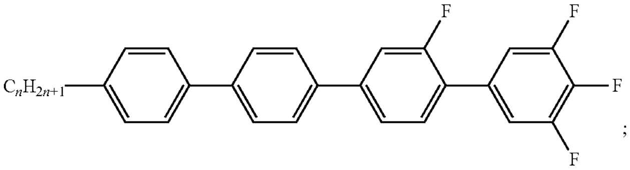
;
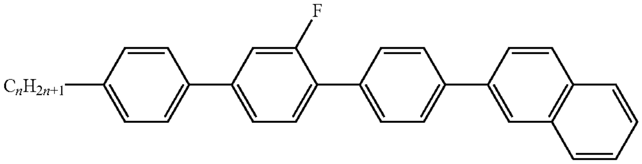
;
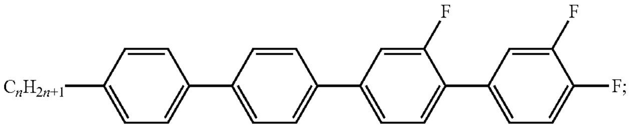

wherein, n represents a positive integer of 1-12, for example, it can be 1, 2, 4, 6, 8, 9, 10, 11, 12 or the like.

In some embodiments of the present invention, the antioxidant is selected from any one or the combination of at least two of the following compounds:

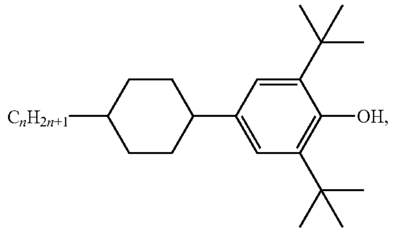

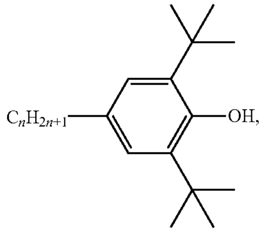

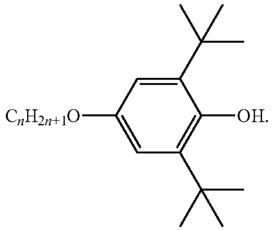

In some embodiments of the present invention, in the liquid crystal composition, percentage by weight of the light stabilizer is 0%-5%, for example, it can be 0%, 0.01%, 0.05%, 0.1%, 0.2%, 0.5%, 1%, 1.5%, 2%, 2.5%, 3%, 3.5%, 4%, 4.5%, 5% or the like, further preferably, 0.01%-1%.

It should be noted that, for an easier calculation, in the present invention, the sum of the weight percentages of the compounds having different general formulas in the liquid crystal composition is one hundred percent, and the content of the additives is not counted within the total content of the liquid crystal composition, that is, the addition of the additives will result in the total content of the components in the liquid crystal composition being >100%.

In some embodiments of the present invention, the liquid crystal composition further comprises a polymerization initiator, exemplarily including, but not limited to: benzoin ethers, benzophenones, acetophenones, benzoin bis-ethers, acyl phosphine oxides and so forth.

In a second aspect, the present invention provides a liquid crystal display device, and the liquid crystal display device comprises a liquid crystal composition as described in the first aspect.

Compared with the prior art, the present invention has the following beneficial effects:

Via designing the specific constitution of the liquid crystal composition and the structures of the compounds, and further using compounds of different general formulas in conjunction, the liquid crystal composition obtained in the present invention has an appropriate optical anisotropy, an appropriate clearing point, an appropriate dielectric anisotropy ($\varepsilon_{\perp}$, $\varepsilon_{//}$ or $\Delta\varepsilon$), a higher $K_{ave}$ value, a higher $\varepsilon_{\perp}/\Delta\varepsilon$ ratio, a higher transmittance, a smaller rotational viscosity, and a longer low-temperature storage time.

DETAILED EMBODIMENTS

For an easier understanding of the present invention, the present invention enumerates the Examples below. It should be clear for the person skilled in the art that, the Examples are only for helping to understand the present invention, and shall not be seen as specific limitations on the present invention.

For the convenience of the expression, in the following Examples, the group structures of the liquid crystal composition are represented by the codes listed in Table 1:

TABLE 1

| Unit structure of group | Code | Name of group |
|---|---|---|
| 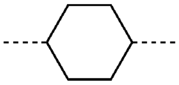 | C | 1,4-cyclohexylidene |
| 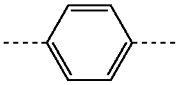 | P | 1,4-phenylene |
| 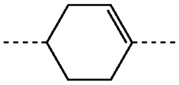 | L | 1,4-cyclohexene |
| 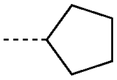 | C(5) | 1-cyclopentyl |
| 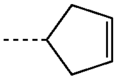 | C(5, V) | 1-cyclopentenyl |

TABLE 1-continued

| Unit structure of group | Code | Name of group |
|---|---|---|
| 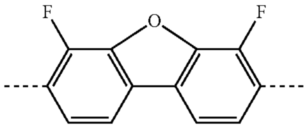 | B(O) | 4,6-difluoro-dibenzo[b,d]furan-3,7-diyl |
| 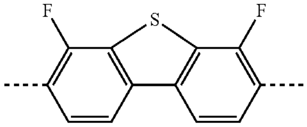 | B(S) | 4,6-difluoro-dibenzo[b,d]thiophene-3,7-diyl |
| 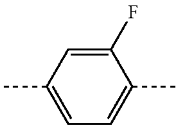 | G | 2-fluoro-1,4-phenylene |
| 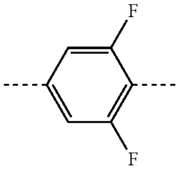 | U | 2,5-difluoro-1,4-phenylene |
| 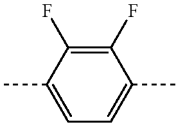 | W | 2,3-difluoro-1,4-phenylene |
| 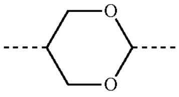 | D | 1,3-dioxane-2,5-diyl |
| 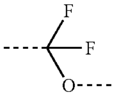 | Q | difluoro ether group |
| —O— | O | oxygen substituent |
| —F | F | fluorine substituent |
| —CH=CH— or —CH=$CH_2$ | V | ethenylene or ethenyl |
| —$CH_2O$— | 1O | methyleneoxy |
| —$CH_2CH_2$— | 2 | ethyl bridge group |
| —$CF_3$ | —$CF_3$ | trifluoromethyl |
| —$C_nH_{2n+1}$ or —$C_nH_{2n}$— | n (n represents a positive integer of 1-12) | alkyl or alkylene |

In Table 1, broken lines represent the binding sites of the groups.

Take the compound with the following structural formula as an example:

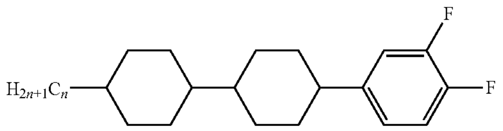

represented by the codes listed in Table 1, this structural formula can be expressed as nCCGF, n in the code represents the number of the carbon atoms of the alkyl on the left, for example, n is "3", meaning that the alkyl is —$C_3H_7$; C in the code represents cyclohexylidene, G represents 2-fluoro-1,4-phenylene, and F represents fluorine.

In the following Examples and Comparative Examples, the abbreviated codes of performance test items are shown in Table 2:

TABLE 2

| The abbreviated codes of the performance test items | |
|---|---|
| Code of test items | Meaning |
| Cp | clearing point (nematic-isotropy phases transition temperature, ° C.) |
| Δn | optical anisotropy (589 nm, 20° C.) |
| Δε | dielectric anisotropy (1 KHz, 20° C.) |
| $ε_⊥$ | dielectric constant perpendicular to the molecular axis (1 KHz, 20° C.) |
| $ε_∥$ | dielectric constant parallel to the molecular axis (1 KHz, 20° C.) |
| LTS(−30° C.) | low-temperature storage stability (stored at −30° C. and the time when crystal precipitation is observed, h) |
| $K_{ave}$ | average elastic constant (20° C.) |
| $γ_1$ | rotational viscosity (20° C., mPa · s) |
| $T_r$ | transmittance (%) |

wherein: Cp (° C.): tested by melting point apparatus quantitative method;

Δn: tested using an Abbe Refractometer under a sodium lamp (589 nm) light source, at 20° C., $Δn=n_e−n_o$, $n_o$ is ordinary ray refraction index, $n_e$ is extraordinary ray refraction index;

Δε: $Δε=ε_{I}−ε_⊥$, wherein $ε_I$ is the dielectric constant parallel to the molecular axis, $ε_⊥$ is the dielectric constant perpendicular to the molecular axis, test conditions: 20° C., 1 KHz, test cell is TN cell with a cell gap of 7 μm;

$γ_1$: tested using a LCM-2 type liquid crystal physical property evaluation system; test conditions: 20° C., 160-260 V, the cell gap for test is 20 μm;

$K_{ave}$: $K_{ave}=(K_{11}+K_{22}+K_{33})/3$, wherein $K_{11}$ is splay elastic constant, $K_{22}$ is twist elastic constant, $K_{33}$ is bend elastic constant, $K_{11}$, $K_{22}$, $K_{33}$ are obtained via testing the capacitance-voltage characteristic curves (C-V curves) of liquid crystal by LCR meter and anti-parallel friction cell and calculating; test conditions: anti-parallel friction cell of 7 μm, V=0.1~20 V.

$T_r$: using DMS 505 photoelectric integrated tester to test the V-T curve of dimming device, taking the maximum value of transmittance on the V-T curve as the transmittance of the liquid crystal, the test cell adopts positive 3.5 μm IPS test cell, V-0~20V.

LTS(−30° C.): nematic phase liquid crystal medium is placed in a 3.5 μm IPS test cell antiparallel cell, stored at a constant temperature of −30° C., the time recorded when crystal precipitation is observed, wherein, 168 h NG represents crystals precipitate after 168 h of storage, 168 h OK represents crystals do not precipitate after 168 h of storage, and 240 h OK represents crystals do not precipitate after 240 h of storage.

Example 1

The present Example provides a liquid crystal composition comprising components in the percentages by weight as shown in the table below, and the performance tests are carried out by filling the same into the two substrates of the

| Code of component | Content | Test result of performance parameters | |
|---|---|---|---|
| 3CPWO2 (N-21) | 5 | Δn | 0.11 |
| VCCP1 (M-10) | 10 | Cp | 88.5 |
| 3CCV (M-1) | 35.5 | $ε_⊥$ | 3.5 |
| V2CCP1 (M-10) | 1.5 | $ε_∥$ | 11.7 |
| 3CCV1 (M-1) | 10 | Δε | 8.2 |
| 1PP2V1 (M-3) | 4 | $ε_⊥/Δε$ | 0.43 |
| 5PGP(NA) | 0.3 | $K_{ave}$ | 13.5 |

-continued

| Code of component | Content | Test result of performance parameters | |
|---|---|---|---|
| 4OB(S)O1C(5, V) (I-1) | 2 | $T_r$ | 16.8 |
| 3PGUQUF (A-1-12) | 4.8 | $γ_1$ | 73 |
| 4PGUQUF (A-1-12) | 4.8 | LTS (−30° C.) | 240 h OK |
| 5PGUQUF (A-1-12) | 4 | | |
| 3DGUQUF (III) | 3 | | |
| 4DGUQUF (III) | 3 | | |
| 3DPUQUF (III) | 1.8 | | |
| 4DPUQUF (III) | 1.8 | | |
| 3CPP2V1 (M-10) | 2.8 | | |
| 3CLPCF3 (II-2-2) | 4 | | |
| 3DPUF (A-2-10) | 2 | | |

wherein, the structural formula of 5PGP (NA) is

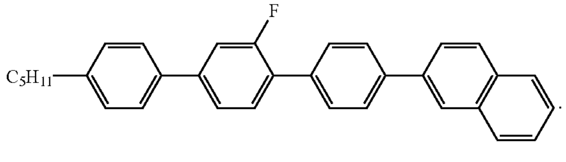

Example 2

The present Example provides a liquid crystal composition comprising components in the percentages by weight as shown in the table below, and the performance tests are carried out by filling the same into the two substrates of the liquid crystal display device:

| Code of component | Content | Test result of performance parameters | |
|---|---|---|---|
| 2OB(S)O1C(5, V) (I-1) | 5 | Δn | 0.108 |
| VCCP1 (M-10) | 10 | Cp | 84.5 |
| 3CCV (M-1) | 37.5 | $\varepsilon_\perp$ | 3.7 |
| VLCP1 (II-1-1) | 1.5 | $\varepsilon_\parallel$ | 11.6 |
| 3CCV1 (M-1) | 10 | Δε | 7.9 |
| 1PP2V1 (M-3) | 4 | $\varepsilon_\perp/\Delta\varepsilon$ | 0.47 |
| 4OB(S)O1C(5, V) (I-1) | 2 | $K_{ave}$ | 13.7 |
| 3PGUQUF (A-1-12) | 4.8 | $T_r$ | 17.5 |
| 4PGUQUF (A-1-12) | 4.8 | $\gamma_1$ | 71 |
| 5PGUQUF (A-1-12) | 4 | LTS (−30° C.) | 240 h OK |
| 3DGUQUF (III) | 3 | | |
| 4DGUQUF (III) | 3 | | |
| 3DPUQUF (III) | 1.8 | | |
| 4DPUQUF (III) | 1.8 | | |
| 3CPP2V1 (M-11) | 2.8 | | |
| $3CLPCF_3$ (II-2-2) | 4 | | |

Example 3

The present Example provides a liquid crystal composition comprising components in the percentages by weight as shown in the table below, and the performance tests are carried out by filling the same into the two substrates of the liquid crystal display device:

| Code of component | Content | Test result of performance parameters | |
|---|---|---|---|
| VCCP1 (M-10) | 10 | Δn | 0.108 |
| 3CCV (M-1) | 35.5 | Cp | 87.4 |
| V2CCP1 (M-10) | 3 | $\varepsilon_\perp$ | 3.6 |
| 3CCV1 (M-1) | 10 | $\varepsilon_\parallel$ | 11.4 |
| 1PP2V1 (M-3) | 2 | Δε | 7.8 |
| 3PGP2 (M-13) | 2.5 | $\varepsilon_\perp/\Delta\varepsilon$ | 0.46 |
| 4OB(S)O1C(5, V) (I-1) | 5 | $K_{ave}$ | 13.4 |
| 3PGUQUF (A-1-12) | 4.8 | $T_r$ | 17.2 |
| 4PGUQUF (A-1-12) | 4.8 | $\gamma_1$ | 70 |
| 5PGUQUF (A-1-12) | 4 | LTS (−30° C.) | 240 h OK |
| 3DGUQUF (III) | 3.3 | | |
| 4DGUQUF (III) | 3.3 | | |
| 3DPUQUF (III) | 1.5 | | |
| 4DPUQUF (III) | 1.5 | | |
| 3CPP2V (M-10) | 2.8 | | |
| $3CLPCF_3$ (II-2-2) | 4 | | |
| 3DPUF (A-2-10) | 2 | | |

Example 4

The present Example provides a liquid crystal composition comprising components in the percentages by weight as shown in the table below, and the performance tests are carried out by filling the same into the two substrates of the liquid crystal display device:

| Code of component | Content | Test result of performance parameters | |
|---|---|---|---|
| VCCP1 (M-10) | 10 | Δn | 0.109 |
| 3CCV (M-1) | 35.5 | Cp | 86.8 |
| VLCP1 (II-1-2) | 3 | $\varepsilon_\perp$ | 3.5 |
| 3CCV1 (M-1) | 10 | $\varepsilon_\parallel$ | 11.5 |
| 1PP2V1 (M-3) | 4.5 | Δε | 8 |
| 4OB(S)O1C(5, V) (I-1) | 5 | $\varepsilon_\perp/\Delta\varepsilon$ | 0.44 |
| 3PGUQUF (A-1-12) | 4.5 | $K_{ave}$ | 13.9 |
| 4PGUQUF (A-1-12) | 4.5 | $T_r$ | 17.5 |
| 5PGUQUF (A-1-12) | 4.5 | $\gamma_1$ | 72 |

-continued

| Code of component | Content | Test result of performance parameters | |
|---|---|---|---|
| 3DGUQUF (III) | 3.5 | LTS (−30° C.) | 240 h OK |
| 4DGUQUF (III) | 3.5 | | |
| 3DPUQUF (III) | 1.5 | | |
| 4DPUQUF (III) | 1.5 | | |
| 3CPP2V1 (M-11) | 2.5 | | |
| $3CLPCF_3$ (II-2-2) | 6 | | |

Example 5

The present Example provides a liquid crystal composition comprising components in the percentages by weight as shown in the table below, and the performance tests are carried out by filling the same into the two substrates of the liquid crystal display device:

| Code of component | Content | Test result of performance parameters | |
|---|---|---|---|
| VCCP1 (M-10) | 10 | Δn | 0.098 |
| 3CCV (M-1) | 33.5 | Cp | 83.9 |
| VLCP1 (II-1-1) | 3 | $\varepsilon_\perp$ | 3.9 |
| 3CCV1 (M-1) | 12 | $\varepsilon_\parallel$ | 9.4 |
| 1PP2V1 (M-3) | 3 | Δε | 5.5 |
| 4OB(S)O1C(5, V) (I-1) | 5 | $\varepsilon_\perp/\Delta\varepsilon$ | 0.71 |
| 3PUQUF (A-1-5) | 10 | $K_{ave}$ | 13.5 |
| 3DGUQUF (III) | 3.5 | $T_r$ | 17.3 |
| 4DGUQUF (III) | 3.5 | $\gamma_1$ | 74 |
| 3DPUQUF (III) | 1.5 | LTS (−30° C.) | 240 h OK |
| 4DPUQUF (III) | 1.5 | | |
| 3CPP2V1 (M-11) | 2.5 | | |
| $3CLPCF_3$ (II-2-2) | 4 | | |
| 3CLWO2 (N-12) | 3.5 | | |
| 4CLWO2 (N-12) | 3.5 | | |

Example 6

The present Example provides a liquid crystal composition comprising components in the percentages by weight as shown in the table below, and the performance tests are carried out by filling the same into the two substrates of the liquid crystal display device:

| Code of component | Content | Test result of performance parameters | |
|---|---|---|---|
| VCCP1 (M-10) | 10 | Δn | 0.101 |
| 3CCV (M-1) | 33.5 | Cp | 79.5 |
| VLCP1 (II-1-1) | 3 | $\varepsilon_\perp$ | 3.4 |
| 3CCV1 (M-1) | 12 | $\varepsilon_\parallel$ | 10.5 |
| 1PP2V1 (M-3) | 4.5 | Δε | 7.1 |
| 4OB(S)O1C(5, V) (I-1) | 5 | $\varepsilon_\perp/\Delta\varepsilon$ | 0.48 |
| 3PUQUF (A-1-5) | 10 | $K_{ave}$ | 13.2 |
| 3DGUQUF (III) | 3.5 | $T_r$ | 16.9 |
| 4DGUQUF (III) | 3.5 | $\gamma_1$ | 71 |
| 3D2PUQUF (III) | 2 | LTS (−30° C.) | 240 h OK |
| 4D2PUQUF (III) | 1.5 | | |
| 3DPUQUF (III) | 1.5 | | |
| 4DPUQUF (III) | 1.5 | | |
| 3CPP2V1 (M-11) | 2.5 | | |
| $3CLPCF_3$ (II-2-2) | 6 | | |

Comparative Example 1

The present Comparative Example provides a liquid crystal composition comprising components in the percentages by weight as shown in the table below, and the performance tests are carried out by filling the same into the two substrates of the liquid crystal display device:

| Code of component | Content | Test result of performance parameters | |
|---|---|---|---|
| VCCP1 (M-10) | 13 | Δn | 0.1 |
| 3CCV (M-1) | 33.5 | Cp | 79 |
| 3CCV1 (M-1) | 12 | $\varepsilon_\perp$ | 3.4 |
| 1PP2V1 (M-3) | 4.5 | $\varepsilon_\parallel$ | 105 |
| 4OB(S)O1C(5, V) (I-1) | 5 | Δε | 7.1 |
| 3PUQUF (A-1-5) | 10 | $\varepsilon_\perp/\Delta\varepsilon$ | 0.48 |
| 3DGUQUF (III) | 3.5 | $K_{ave}$ | 12.4 |
| 4DGUQUF (III) | 3.5 | $T_r$ | 14.9 |
| 3D2PUQUF (III) | 2 | $\gamma_1$ | 74 |
| 4D2PUQUF (III) | 1.5 | LTS (−30° C.) | 168 h NG |
| 3DPUQUF (III) | 1.5 | | |
| 4DPUQUF | 1.5 | | |
| 3CPP2V1 (M-11) | 2.5 | | |
| 3CCPCF$_3$ (M-10) | 6 | | |

Comparative Example 2

The present Comparative Example provides a liquid crystal composition comprising components in the percentages by weight as shown in the table below, and the performance tests are carried out by filling the same into the two substrates of the liquid crystal display device:

| Code of component | Content | Test result of performance parameters | |
|---|---|---|---|
| VCCP1 (M-10) | 10 | Δn | 0.101 |
| 3CCV (M-1) | 33.5 | Cp | 79.1 |
| VLCP1 (II-1) | 3 | $\varepsilon_\perp$ | 3.4 |
| 3CCV1 (M-1) | 12 | $\varepsilon_\parallel$ | 10.5 |
| 1PP2V1 (M-3) | 4.5 | Δε | 7.1 |
| 4OB(S)O1C(5) | 5 | $\varepsilon_\perp/\Delta\varepsilon$ | 0.48 |
| 3PUQUF (A-1-5) | 10 | $K_{ave}$ | 12.8 |
| 3DGUQUF (III) | 3.5 | $T_r$ | 15.2 |
| 4DGUQUF (III) | 3.5 | $\gamma_1$ | 75 |
| 3D2PUQUF (III) | 2 | LTS (−30° C.) | 240 h OK |
| 4D2PUQUF (III) | 1.5 | | |
| 3DPUQUF (III) | 1.5 | | |
| 4DPUQUF (III) | 1.5 | | |
| 3CPP2V1 (M-11) | 2.5 | | |
| 3CLPCF3 (II-2) | 6 | | |

It can be seen from the comparison of Comparative Examples 1-2 and Example 6 that via the optimization on the structures of general formula I and general formula II-1/II-2, the liquid crystal composition of the present invention has an appropriate optical anisotropy, an appropriate clearing point, an appropriate dielectric anisotropy ($\varepsilon_\perp$, $\varepsilon_{//}$, $\varepsilon_\perp/\Delta\varepsilon$), a larger $K_{ave}$ value, a higher transmittance, a smaller rotational viscosity, and a better low-temperature storage stability.

Example 7

The present Example provides a liquid crystal composition comprising components in the percentages by weight as shown in the table below, and the performance tests are carried out by filling the same into the two substrates of the liquid crystal display device:

| Code of component | Content | Test result of performance parameters | |
|---|---|---|---|
| VCCP1 (M-10) | 10 | Δn | 0.102 |
| 3CCV (M-1) | 29.5 | Cp | 81.5 |
| VLCP1 (II-1-1) | 3 | $\varepsilon_\perp$ | 3.4 |
| 3CCV1 (M-1) | 10 | $\varepsilon_\parallel$ | 10.2 |
| 3CPO2 (M-2) | 3 | Δε | 6.8 |
| 3CC2 (M-1) | 3 | $\varepsilon_\perp/\Delta\varepsilon$ | 0.5 |
| 1PP2V1 (M-3) | 4.5 | $K_{ave}$ | 13.8 |

-continued

| Code of component | Content | Test result of performance parameters | |
|---|---|---|---|
| 4OB(S)O1C(5, V) (I-1) | 5 | $T_r$ | 17.6 |
| 3CPUF (A-2-9) | 5 | $\gamma_1$ | 70 |
| 3PUQUF (A-1-5) | 5 | LTS (−30° C.) | 240 h OK |
| 3DGUQUF (III) | 3.5 | | |
| 4DGUQUF (III) | 3.5 | | |
| 3D2PUQUF (III) | 2 | | |
| 4D2PUQUF (III) | 1.5 | | |
| 3DPUQUF (III) | 1.5 | | |
| 4DPUQUF (III) | 1.5 | | |
| 3CPP2V1 (M-11) | 2.5 | | |
| 3CLPCF$_3$ (II-2-2) | 6 | | |

Example 8

The present Example provides a liquid crystal composition comprising components in the percentages by weight as shown in the table below, and the performance tests are carried out by filling the same into the two substrates of the liquid crystal display device:

| Code of component | Content | Test result of performance parameters | |
|---|---|---|---|
| VCCP1 (M-10) | 10 | Δn | 0.1 |
| 3CCV (M-1) | 29.5 | Cp | 81.5 |
| VLCP1 (II-1-1) | 3 | $\varepsilon_\perp$ | 3.4 |
| 3CCV1 (M-1) | 10 | $\varepsilon_\parallel$ | 9.8 |
| 3CPO2 (M-2) | 3 | Δε | 6.4 |
| 3CC2 (M-1) | 3 | $\varepsilon_\perp/\Delta\varepsilon$ | 0.53 |
| 1PP2V1 (M-3) | 4.5 | $K_{ave}$ | 13.5 |
| 4OB(O)O1C(5, V) (I-1) | 5 | $T_r$ | 17.3 |
| 3CPUF (A-2-9) | 5 | $\gamma_1$ | 71 |
| 3PUQUF (A-1-5) | 5 | LTS (−30° C.) | 168 h OK |
| 3DGUQUF (III) | 3.5 | | |
| 4DGUQUF (III) | 3.5 | | |
| 3D2PUQUF (III) | 2 | | |
| 4D2PUQUF (III) | 1.5 | | |
| 3DPUQUF (III) | 1.5 | | |
| 4DPUQUF (III) | 1.5 | | |
| 3CPP2V1 (M-11) | 2.5 | | |
| 3CLPCF$_3$ (II-2-2) | 6 | | |

Example 9

The present Example provides a liquid crystal composition comprising components in the percentages by weight as shown in the table below, and the performance tests are carried out by filling the same into the two substrates of the liquid crystal display device:

| Code of component | Content | Test result of performance parameters | |
|---|---|---|---|
| VCCP1 (M-10) | 10 | Δn | 0.098 |
| 3CCV (M-1) | 33.5 | Cp | 83.9 |
| 3CCV1 (M-1) | 12 | $\varepsilon_\perp$ | 4.3 |
| 4OB(S)O1C(5, V) (I-1) | 5 | $\varepsilon_\parallel$ | 9.4 |
| 3PUQUF (A-1-5) | 10 | Δε | 5.1 |
| 3DGUQUF (III) | 3.5 | $\varepsilon_\perp/\Delta\varepsilon$ | 0.84 |
| 4DGUQUF (III) | 3.5 | $K_{ave}$ | 13.2 |
| 3DPUQUF (III) | 1.5 | $T_r$ | 17.3 |
| 4DPUQUF (III) | 1.5 | $\gamma_1$ | 76 |
| 3CPP2V1 (M-11) | 2.5 | LTS (−30° C.) | 240 h OK |
| 3CLPCF$_3$ (II-2-2) | 4 | | |
| 3CLWO2 (N-12) | 3.5 | | |
| 4CLWO2 (N-12) | 3.5 | | |
| 3PWO2 (N-19) | 3 | | |
| 2OPWO2 (N-19) | 3 | | |

It can be seen from the above contents that via designing the specific constitution of the liquid crystal composition and the structures of the compounds, and further using compounds having different general formulas in conjunction, the liquid crystal composition obtained in the present invention has an appropriate optical anisotropy, an appropriate clearing point, a lower rotational viscosity, a higher $K_{ave}$ value and a higher $\varepsilon_{\perp}/\Delta\varepsilon$ ratio, and has higher transmittance and contrast rate, and a remarkable low-temperature storage performance at the same time.

The applicant declares that the liquid crystal composition and liquid crystal display device of the present invention are illustrated by the above Examples of the present invention, but the present invention is not limited to the above Examples, that is, it does not mean that the implement of the present invention must rely on the above Examples. It shall be clear to the person skilled in the art that any improvements of the present invention, equivalent replacements of the raw materials used in the present invention, the additions of any auxiliary components, the selection of specific methods or the like all fall into the protection scope and the disclosure scope of the present invention.

INDUSTRIAL APPLICABILITY

The liquid crystal composition involved in the present invention can be applied to the liquid crystal field.

The invention claimed is:

1. A liquid crystal composition comprising at least one compound of general formula I-1 and at least one compound selected from general formula II-1 and general formula II-2:

I-1

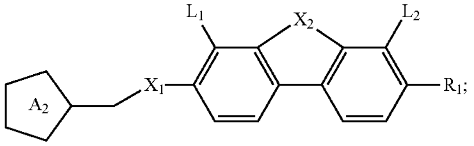

II-1

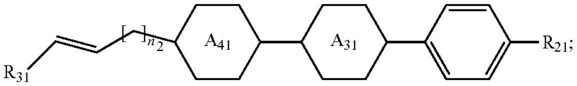

II-2

wherein, $R_1$ represents —H, $C_{1-12}$ halogenated or unhalogenated linear alkyl, $C_{3-12}$ halogenated or unhalogenated branched alkyl, $C_{1-12}$ halogenated or unhalogenated alkoxy, $C_{2-12}$ halogenated or unhalogenated alkenyl, $C_{2-12}$ halogenated or unhalogenated alkenoxy,

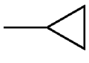, 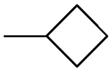 or 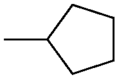;

$R_{21}$ and $R_{32}$ each independently represents $C_{1-12}$ alkyl, $C_{1-12}$ alkoxy, $C_{2-12}$ alkenyl, or $C_{2-12}$ alkenoxy;

$R_{22}$ represents halogen atom, $C_{1-5}$ halogenated alkyl, $C_{1-5}$ halogenated alkoxy, $C_{2-5}$ halogenated alkenyl, or $C_{2-5}$ halogenated alkenoxy;

$R_{31}$ represents —H, $C_{1-12}$ alkyl, or $C_{1-12}$ alkoxy;

ring

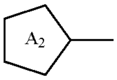

represents

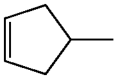;

ring

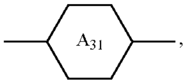, ring

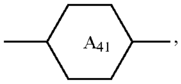, ring

and ring

each independently represents

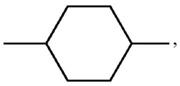, one or at least two —$CH_2$— in

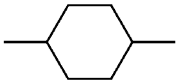

can be replaced by —O—, one or at least two single bond in the rings can be replaced by double bond, and at least one single bond in the rings in at least one of ring

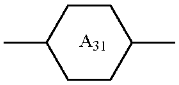

and ring

is replaced by double bond, at least one single bond in the rings in at least one of ring

and ring

is replaced by double bond;

$L_1$ and $L_2$ represent fluorine atom;

$X_1$ represents —O—;

$X_2$ represents —O— or —S—;

$n_2$ represents 0, 1, 2, 3 or 4;

percentage by weight of the compound of general formula I-1 is 0.1%-20%;

percentage by weight of the compound of general formula II-1 is 0.1%-20%;

percentage by weight of the compound of general formula II-2 is 0.1%-20%;

the liquid crystal composition further comprises at least one compound of general formula III:

III

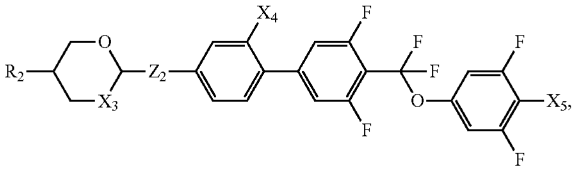

wherein, $R_2$ represents $C_{1-12}$ linear alkyl, $C_{3-12}$ branched alkyl,

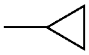, 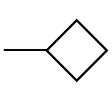 or 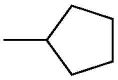, wherein one or at least two nonadjacent —$CH_2$— in the $C_{1-12}$ linear alkyl, $C_{3-12}$ branched alkyl,

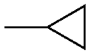, 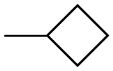 or 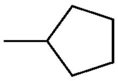

can each be independently replaced by —CH=CH—, —C≡C—, —O—, —CO—, —CO—O— or —O—CO—, and one or at least two-H in the $C_{1-12}$ linear alkyl and $C_{3-12}$ branched alkyl can each be independently replaced by —F or —Cl;

$Z_2$ represents single bond, —$CH_2CH_2$—, —$CF_2CF_2$—, —CO—O—, —O—CO—, —O—CO—O—, —CH=CH—, —CF=CF—, —$CH_2O$— or —$OCH_2$—;

$X_3$ represents —O— or —$CH_2$—;

$X_4$ represents —F or —H; and $X_5$ represents halogen atom, $C_{1-5}$ halogenated alkyl, $C_{1-5}$ halogenated alkoxy, $C_{2-5}$ halogenated alkenyl, or $C_{2-5}$ halogenated alkenoxy;

percentage by weight of the compound of general formula III is 0.1%-20%;

the liquid crystal composition further comprises a group of compounds consisting of at least one compound of general formula A-1 and at least one compound of general formula A-2:

A-1

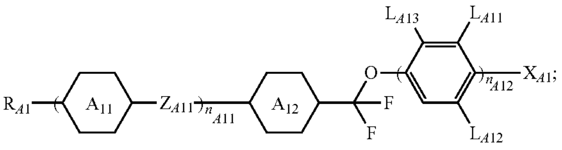

A-2

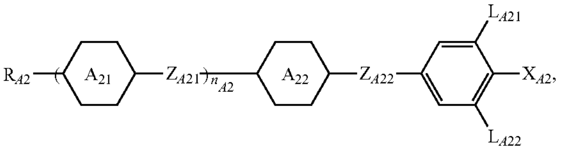

wherein, $R_{A1}$ and $R_{A2}$ each independently represents $C_{1-12}$ linear alkyl, $C_{3-12}$ branched alkyl,

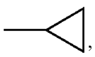, 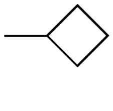 or 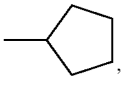, wherein, one or at least two nonadjacent —$CH_2$— in the $C_{1-12}$ linear alkyl, $C_{3-12}$ branched alkyl,

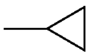, 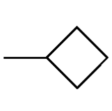 or 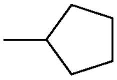

can each be independently replaced by —CH=CH—, —C≡C—, —O—, —CO—, —CO—O— or —O—CO—, and one or at least two-H in the $C_{1-12}$ linear alkyl and $C_{3-12}$ branched alkyl can each be independently replaced by —F or —Cl;

ring

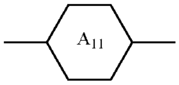

represents

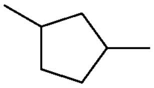, 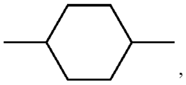, 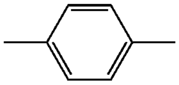 or 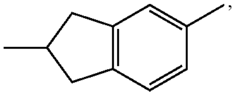, wherein one or at least two $—CH_2—$ in

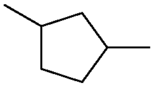 and 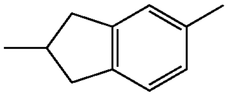

can be replaced by —O—; one or at least two single bond in the rings in

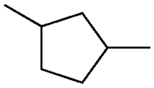, 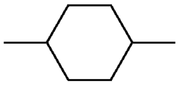 and 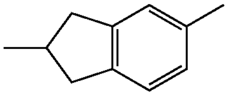

can be replaced by double bond; one or at least two —H on

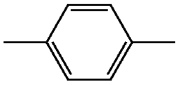 and 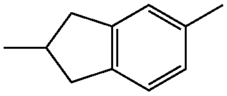

can each be independently replaced by —F, —Cl or —CN, one or at least two —CH═ in the rings can be replaced by —N═;

ring

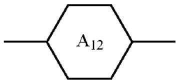

represents

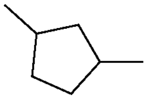, 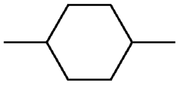,

-continued

 or 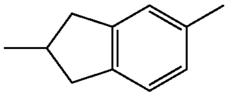, wherein one or at least two $—CH_2—$ in

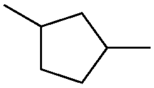, 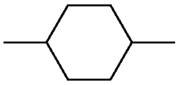 and 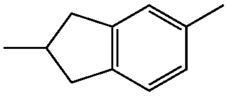

can be replaced by —O—, one or at least two single bond in the rings can be replaced by double bond; one or at least two —H on

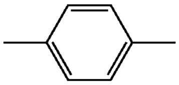 and 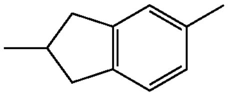

can each be independently replaced by —F, —Cl or —CN, one or at least two —CH═ in the rings can be replaced by —N═;

ring

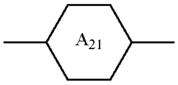 and 

each independently represents

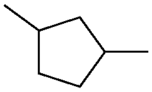, 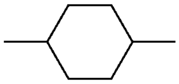, 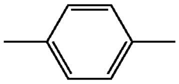 or 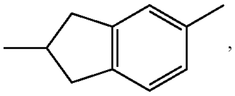, wherein one or at least two $—CH_2—$ in

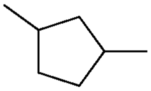, 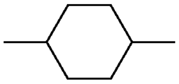 and 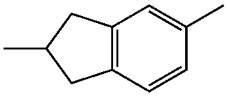

can be replaced by —O—, one or at least two single bond in the rings in

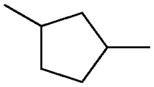 and 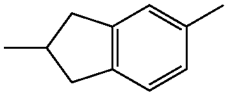

can be replaced by double bond; one or at least two —H on

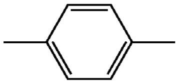 and 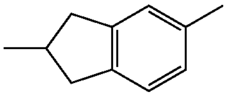

can each be independently replaced by —F, —Cl or —CN, one or at least two —CH═ in the rings can be replaced by —N═;

$Z_{A11}$, $Z_{A21}$ and $Z_{A22}$ each independently represents single bond, —$CH_2CH_2$—, —$CF_2CF_2$—, —CO—O—, —O—CO—, —O—CO—O—, —CH—CH—, —CF═CF—, —$CH_2O$— or —$OCH_2$—;

$L_{A11}$, $L_{A12}$, $L_{A13}$, $L_{A21}$ and $L_{A22}$ each independently represents —H, $C_{1-3}$ alkyl, or halogen atom;

$X_{A1}$ and $X_{A2}$ each independently represents halogen atom, $C_{1-5}$ halogenated alkyl, $C_{1-5}$ halogenated alkoxy, $C_{2-5}$ halogenated alkenyl or $C_{2-5}$ halogenated alkenoxy;

$n_{A11}$ represents 0, 1, 2 or 3, wherein when $n_{A11}$ represents 2 or 3, ring

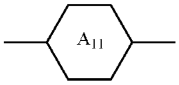

can be the same or different, and $Z_{A11}$ can be the same or different;

$n_{A12}$ represents 1 or 2, wherein when $n_{A12}$ represents 2, ring

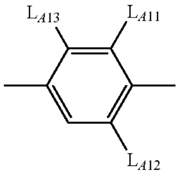

can be the same or different; and $n_{A2}$ represents 0, 1, 2 or 3, wherein when $n_{A2}$ represents 2 or 3, ring

can be the same or different, and $Z_{A21}$ can be the same or different;

percentage by weight of the compound of general formula A-1 is 0.1%-20%;

in the liquid crystal composition, percentage by weight of the compound of general formula A-2 is 0.1%-20%;

the liquid crystal composition further comprises at least one compound of general formula M:

M

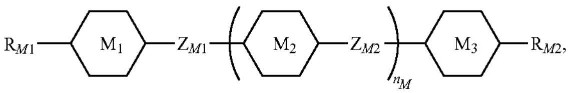

wherein, $R_{M1}$ and $R_{M2}$ each independently represents $C_{1-12}$ linear alkyl, $C_{3-12}$ branched alkyl,

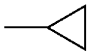, 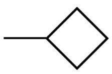 or 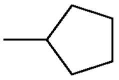, wherein one or at least two nonadjacent —$CH_2$— in the $C_{1-12}$ linear alkyl and $C_{3-12}$ branched alkyl can each be independently replaced by —CH═CH—, —C≡C—, —O—, —CO—, —CO—O— or —O—CO—;

ring

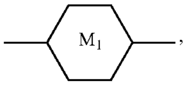, ring

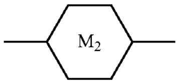

and ring

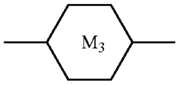

each independently represents

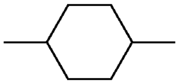 or 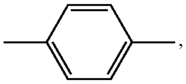, wherein one or at least two —$CH_2$— in

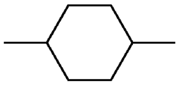

can be replaced by —O—; at most one —H on

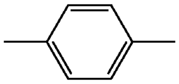

can be replaced by halogen atom;

$Z_{M1}$ and $Z_{M2}$ each independently represents single bond, —CO—O—, —O—CO—, —$CH_2O$—, —$OCH_2$—, —C≡C—, —CH═CH—, —$CH_2CH_2$— or —$(CH_2)_4$—; and $n_M$ represents 0, 1 or 2, wherein when $n_M$ represents 2, ring

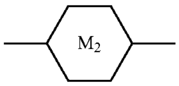

can be the same or different, $Z_{M2}$ can be the same or different;

in the liquid crystal composition, percentage by weight of the compound of general formula Mis 20%-80%.

2. The liquid crystal composition according to claim 1, wherein, in the liquid crystal composition, percentage by weight of the compound of general formula I-1 is 1%-10%.

3. The liquid crystal composition according to claim 1, wherein the compound of general formula II-1 is any one of the compounds with the following structures:

II-1-1

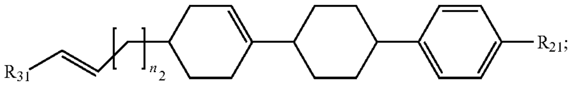

II-1-2

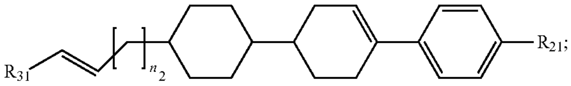

II-1-3

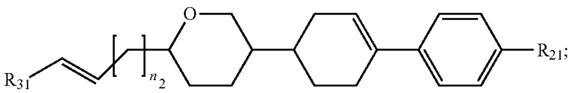

II-1-4

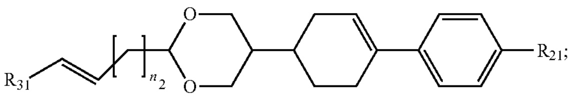

II-1-5

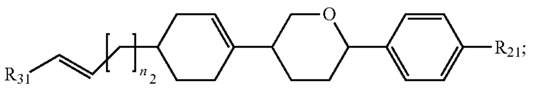

and

II-1-6

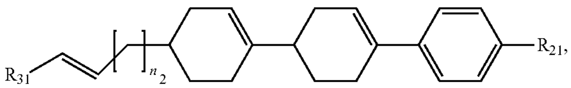

wherein, $R_{21}$ represents $C_{1-12}$ alkyl, $C_{1-12}$ alkoxy, $C_{2-12}$ alkenyl, or $C_{2-12}$ alkenoxy;

$R_{31}$ represents —H, $C_{1-12}$ alkyl, or $C_{1-12}$ alkoxy; and $n_2$ represents 0, 1, 2, 3 or 4.

4. The liquid crystal composition according to claim 1, wherein, in the liquid crystal composition, percentage by weight of the compound of general formula II-1 is 1%-10%.

5. The liquid crystal composition according to claim 1, wherein the compound of general formula II-2 is any one of the compounds with the following structures:

II-2-1

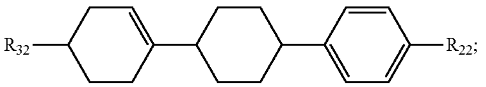

II-2-2

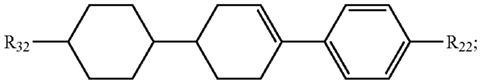

II-2-3

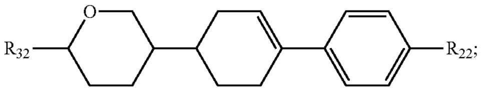

II-2-4

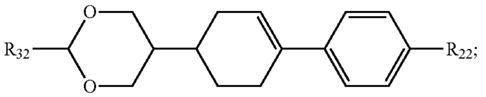

II-2-5

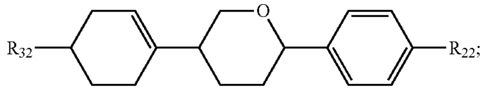

and

II-2-6

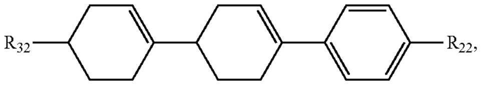

wherein, $R_{22}$ represents halogen atom, $C_{1-5}$ halogenated alkyl, $C_{1-5}$ halogenated alkoxy, $C_{2-5}$ halogenated alkenyl, or $C_{2-5}$ halogenated alkenoxy; and $R_{32}$ represents $C_{1-12}$ alkyl, $C_{1-12}$ alkoxy, $C_{2-12}$ alkenyl, or $C_{2-12}$ alkenoxy.

6. The liquid crystal composition according to claim 1, wherein, in the liquid crystal composition, percentage by weight of the compound of general formula II-2 is 1%-10%.

7. The liquid crystal composition according to claim 1, wherein, in the liquid crystal composition, sum of percentages by weight of the compounds of general formula II-1 and general formula II-2 is 0.1%-30%.

8. The liquid crystal composition according to claim 7, wherein, in the liquid crystal composition, sum of percentages by weight of the compounds of general formula II-1 and general formula II-2 is 1%-15%.

9. The liquid crystal composition according to claim 1, wherein, in the liquid crystal composition, percentage by weight of the compound of general formula III is 5%-15%.

10. The liquid crystal composition according to claim 1, wherein the liquid crystal composition further comprises at least one compound of general formula N:

N

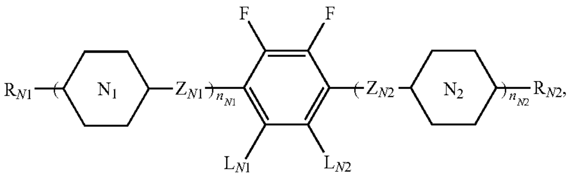

wherein, $R_{N1}$ and $R_{N2}$ each independently represents $C_{1-12}$ linear alkyl, $C_{3-12}$ branched alkyl,

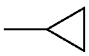, 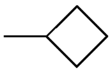 or 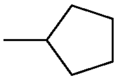, wherein one or at least two nonadjacent —$CH_2$— in the $C_{1-12}$ linear alkyl and $C_{3-12}$ branched alkyl can each be independently replaced by —CH═CH—, —C≡C—, —O—, —CO—, —CO—O— or —O—CO—;

ring

and ring

each independently represents

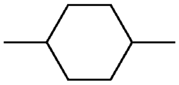 or 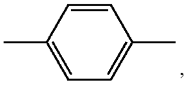, wherein one or at least two —$CH_2$— in

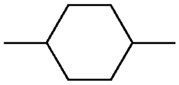

can be replaced by —O—, one or at least two single bond in the rings can be replaced by double bond; one or at least two —H on

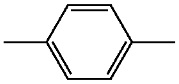

can each be independently replaced by —F, —Cl or —CN, one or at least two —CH═ in the rings can be replaced by —N═;

$Z_{N1}$ and $Z_{N2}$ each independently represents single bond, —CO—O—, —O—CO—, —$CH_2$O—, —O$CH_2$—, —CH═CH—, —C≡C—, —$CH_2CH_2$—, —$CF_2CF_2$—, —$(CH_2)_4$—, —$CF_2$O— or —O$CF_2$—;

$L_{N1}$ and $L_{N2}$ each independently represents —H, $C_{1-3}$ alkyl, or halogen atom; and $n_{N1}$ represents 0, 1, 2 or 3, $n_{N2}$ represents 0 or 1, and $0 \leq n_{N1}+n_{N2} \leq 3$, wherein when $n_{N1}$ represents 2 or 3, ring

can be the same or different, and $Z_{N1}$ can be the same or different.

11. The liquid crystal composition according to claim 10, wherein the compound of general formula N is any one of the compounds with the following structures:

N-1

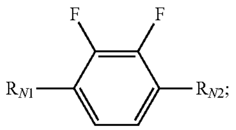

N-2

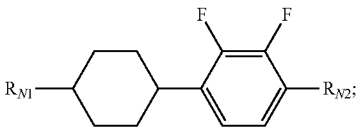

N-3

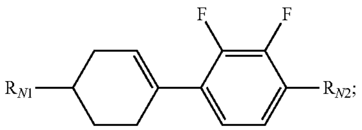

N-4

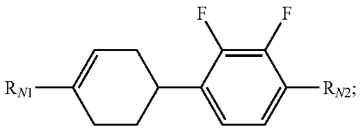

N-5

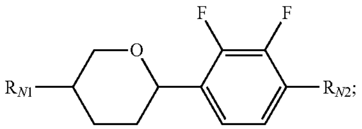

N-6

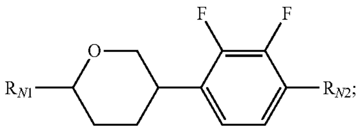

N-7

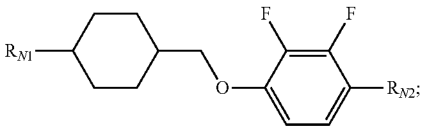

N-8

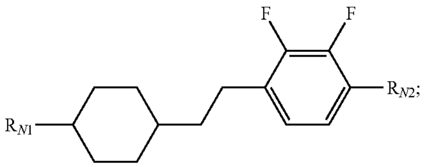

N-9

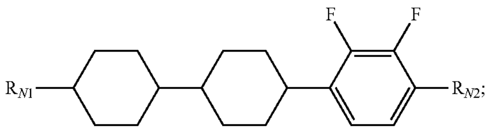

N-10

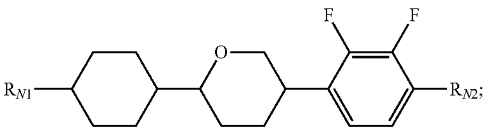

-continued
N-11
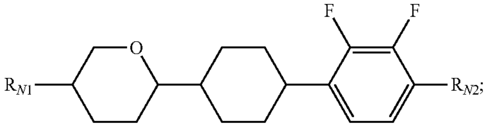
N-12
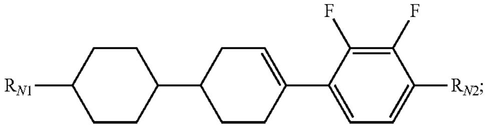
N-13
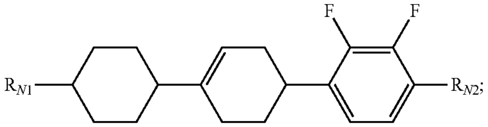
N-14
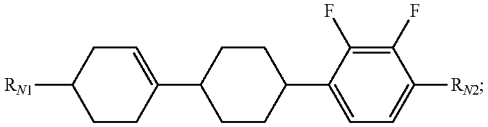
N-15
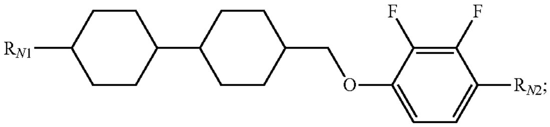
N-16
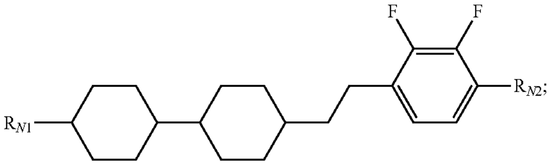
N-17
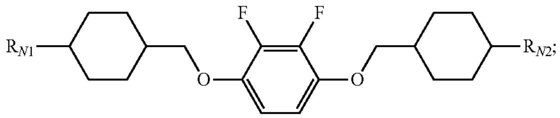
N-18
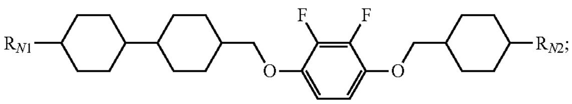
N-19
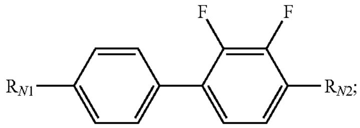
N-20
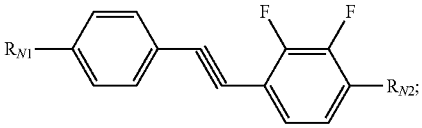
N-21
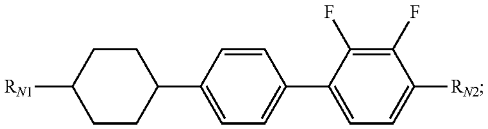
-continued
N-22
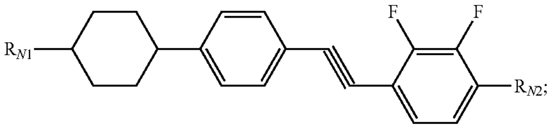
N-23
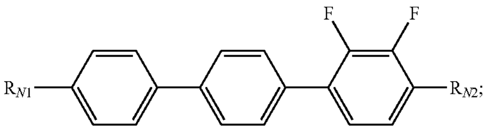
N-24
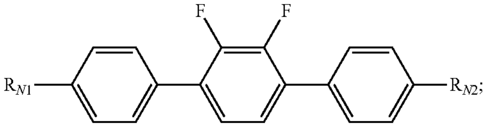
N-25
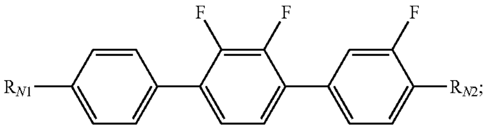
N-26
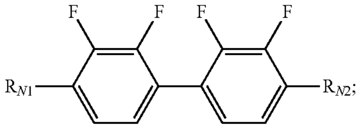
N-27
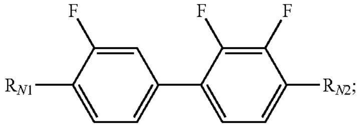
N-28
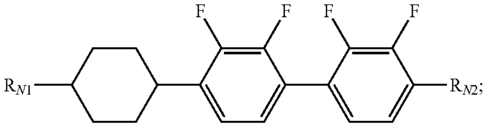
N-29
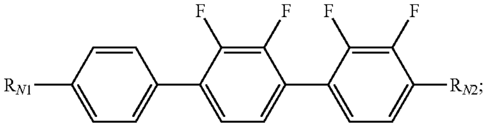
N-30
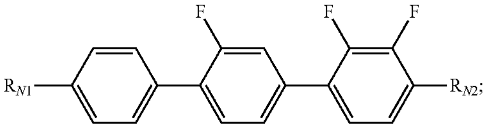
N-31
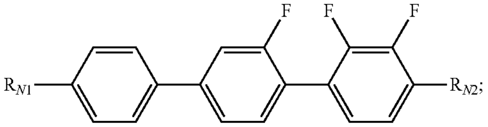
N-32
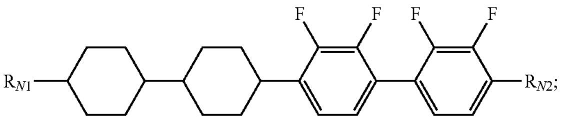

-continued

N-33

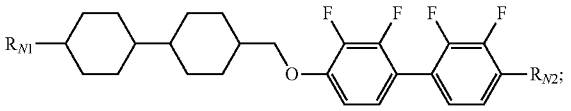

N-34

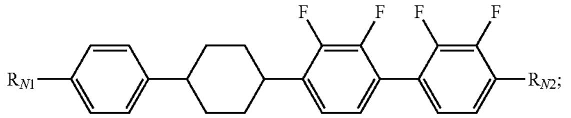

N-35

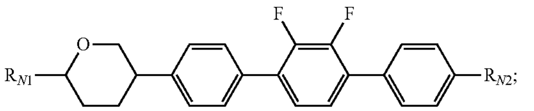

and

N-36

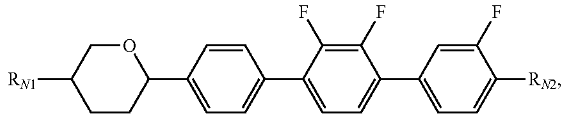

wherein, $R_{N1}$ and $R_{N2}$ each independently represents $C_{1-12}$ linear alkyl, $C_{3-12}$ branched alkyl,

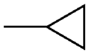, 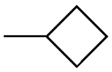 or 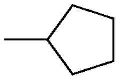, wherein one or at least two nonadjacent —$CH_2$— in the $C_{1-12}$ linear alkyl and $C_{3-12}$ branched alkyl can each be independently replaced by —CH═CH—, —C≡C—, —O—, —CO—, —CO—O— or —O—CO—.

12. The liquid crystal composition according to claim 10, wherein the compound of general formula N is any one of the compounds with the following structures:

N-12

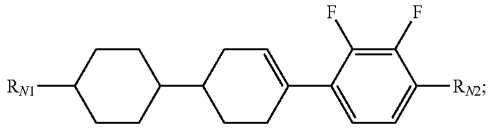

N-19

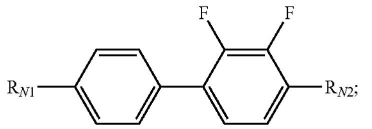

and

N-21

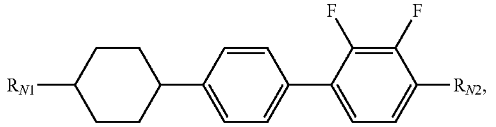

wherein, $R_{N1}$ and $R_{N2}$ each independently represents $C_{1-12}$ linear alkyl, $C_{3-12}$ branched alkyl,

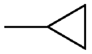, 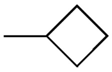 or 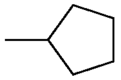, wherein one or at least two nonadjacent —$CH_2$— in the $C_{1-12}$ linear alkyl and $C_{3-12}$ branched alkyl can each be independently replaced by —CH═CH—, —C≡C—, —O—, —CO—, —CO—O— or —O—CO—.

13. The liquid crystal composition according to claim 10, wherein, in the liquid crystal composition, percentage by weight of the compound of general formula N is 0.1%-20%.

14. The liquid crystal composition according to claim 13, wherein, in the liquid crystal composition, percentage by weight of the compound of general formula Nis 2%-15%.

15. The liquid crystal composition according to claim 1, wherein the compound of general formula A-1 is any one of the compounds with the following structures:

A-1-1

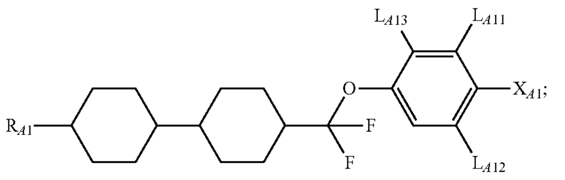

A-1-2

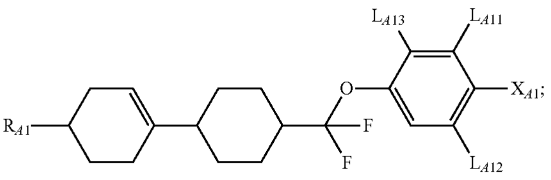

A-1-3

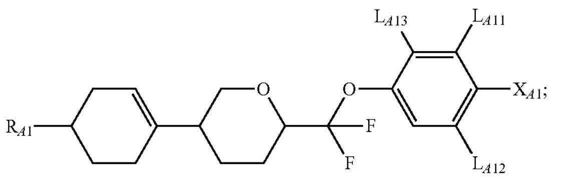

A-1-4

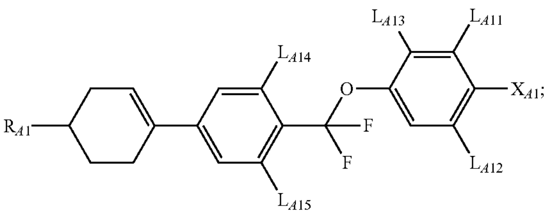

-continued
A-1-5
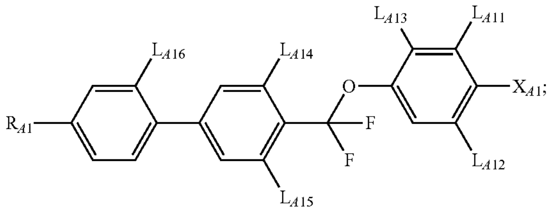
A-1-6
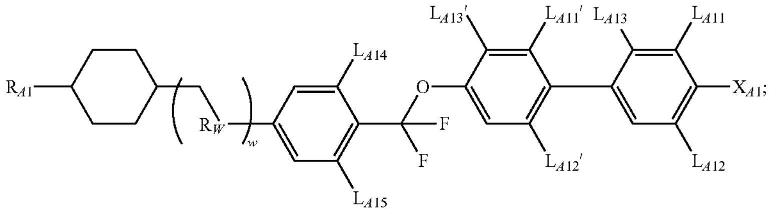
A-1-7
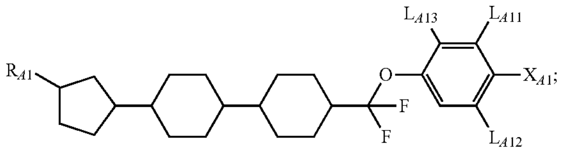
A-1-8
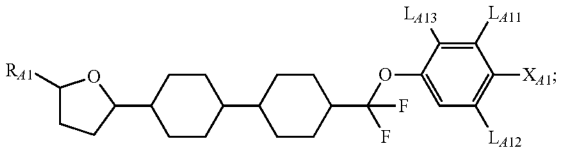
A-1-9
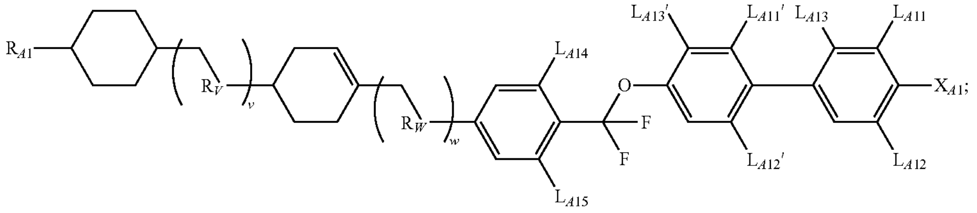
A-1-10
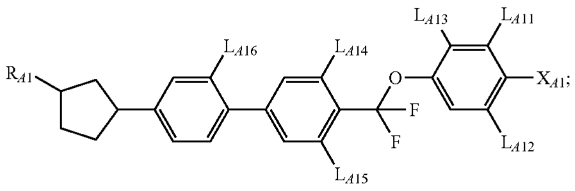
A-1-11
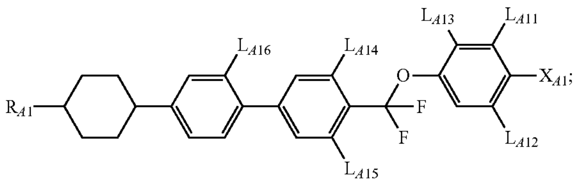
A-1-12
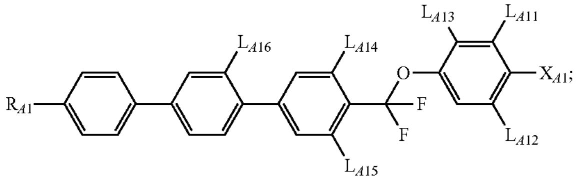
A-1-13
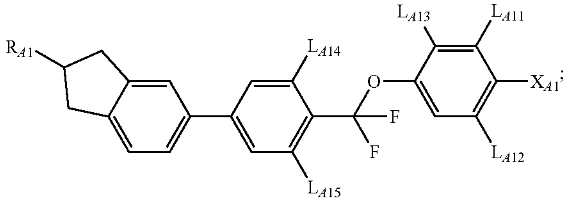
A-1-14
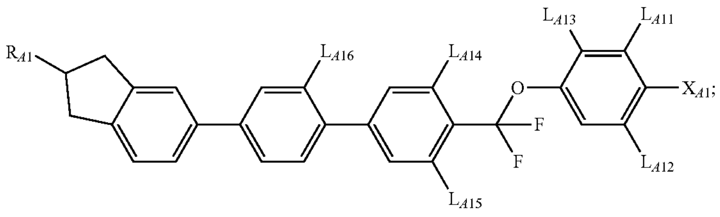
and -continued

A-1-15

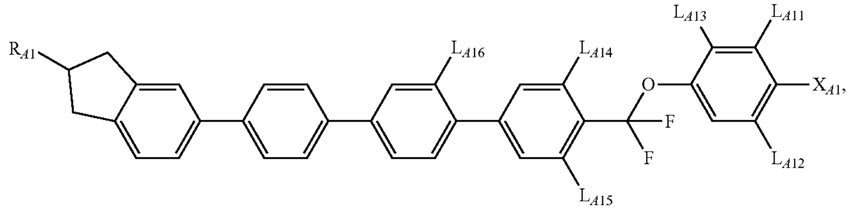

wherein, $R_{A1}$ represents $C_{1-8}$ linear alkyl, $C_{3-8}$ branched alkyl,

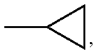, 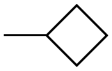 or 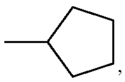, wherein one or at least two nonadjacent $-CH_2-$ in the $C_{1-8}$ linear alkyl and $C_{3-8}$ branched alkyl can each be independently replaced by $-CH{=}CH-$, $-C{\equiv}C-$, $-O-$, $-CO-$, $-CO-O-$ or $-O-CO-$, and one or at least two $-H$ in the $C_{1-8}$ linear alkyl and $C_{3-8}$ branched alkyl can each be independently replaced by $-F$ or $-Cl$;

$R_v$ and $R_w$ each independently represents $-CH_2-$ and $-O-$;

v and w each independently represents 0 or 1;

$L_{A11}$, $L_{A12}$, $L_{A11}'$, $L_{A12}'$, $L_{A14}$, $L_{A15}$ and $L_{A16}$ each independently represents $-H$ or $-F$;

$L_{A13}$ and $L_{A13}'$ each independently represents $-H$ or $-CH_3$; and $X_{A1}$ represents $-F$, $-CF_3$ or $-OCF_3$.

16. The liquid crystal composition according to claim 1, wherein, in the liquid crystal composition, percentage by weight of the compound of general formula A-1 is 4%-15%.

17. The liquid crystal composition according to claim 1, wherein the compound of general formula A-2 is any one of the compounds with the following structures:

A-2-1

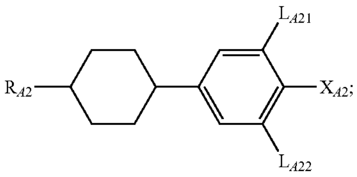

A-2-2

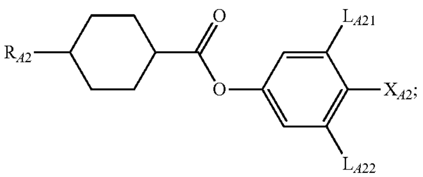

A-2-3

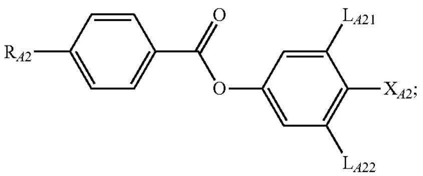

-continued

A-2-4

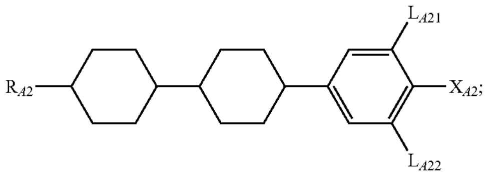

A-2-5

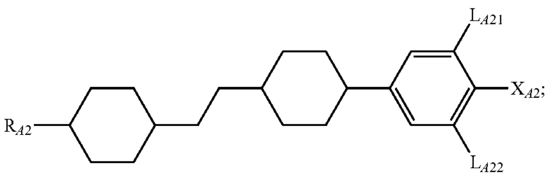

A-2-6

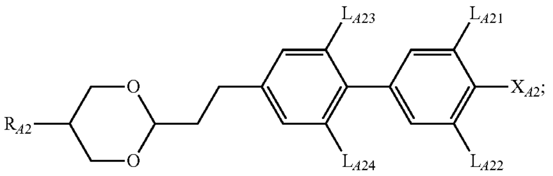

A-2-7

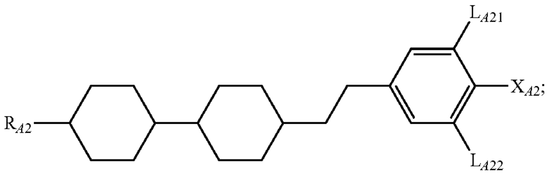

A-2-8

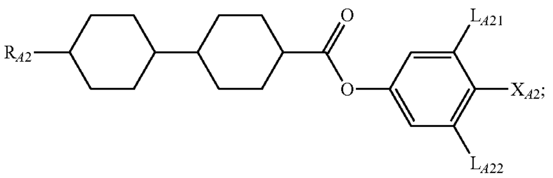

A-2-9

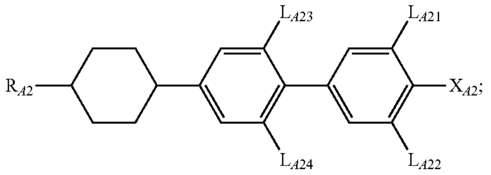

-continued

A-2-10

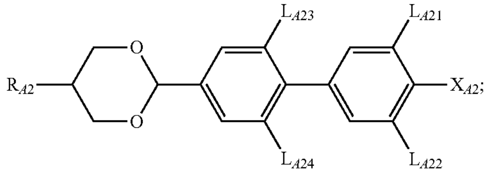

A-2-11

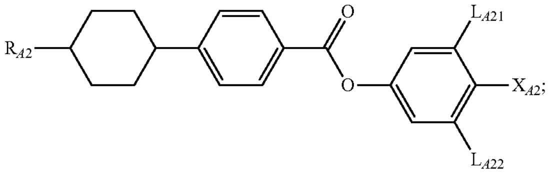

A-2-12

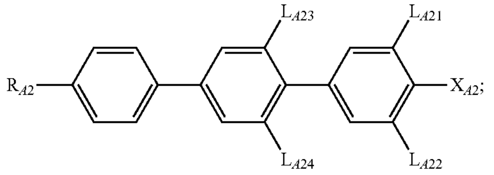

A-2-13

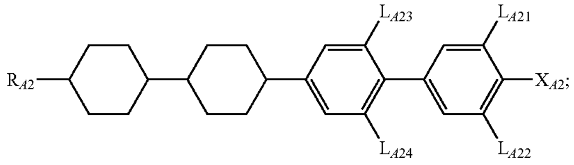

A-2-14

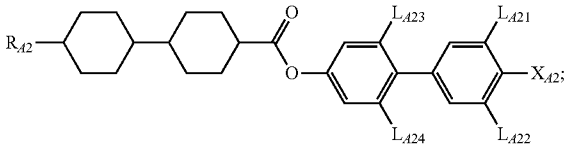

A-2-15

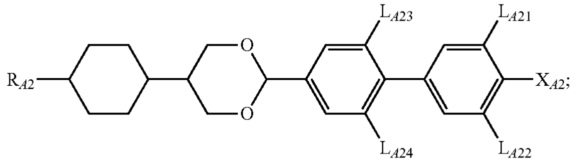

A-2-16

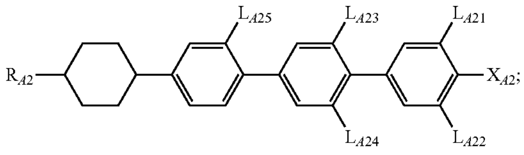

and

A-2-17

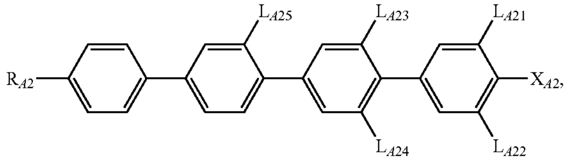

wherein, $R_{A2}$ represents $C_{1-8}$ linear alkyl, $C_{3-8}$ branched alkyl, wherein one or at least two nonadjacent —$CH_2$— in the $C_{1-8}$ linear alkyl and $C_{3-8}$ branched alkyl can each be independently replaced by —CH═CH—, —C≡C—, —O—, —CO—, —CO—O— or —O—CO—, and one or at least two —H in the $C_{1-8}$ linear alkyl and $C_{3-8}$ branched alkyl can each be independently replaced by —F or —Cl;

$L_{A21}$, $L_{A22}$, $L_{A23}$, $L_{A24}$ and $L_{A25}$ each independently represents —H or —F; and $X_{A2}$ represents —F, —$CF_3$, —$OCF_3$ or —$CH_2CH_2CH$═$CF_2$.

18. The liquid crystal composition according to claim 1, wherein, in the liquid crystal composition, percentage by weight of the compound of general formula A-2 is 1%-10%.

19. The liquid crystal composition according to claim 1, wherein, in the liquid crystal composition, sum of percentages by weight of the compound of general formula A-1 and the compound of general formula A-2 is 0.1%-30%.

20. The liquid crystal composition according to claim 1, wherein the compound of general formula M is any one of the compounds with the following structures:

M-1

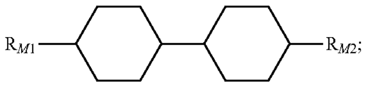

M-2

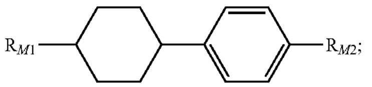

M-3

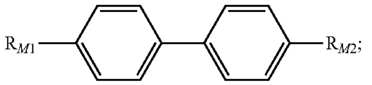

M-4

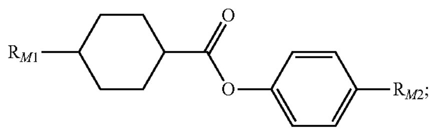

M-5

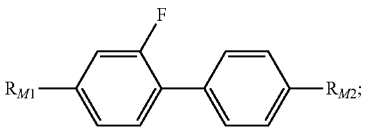

M-6

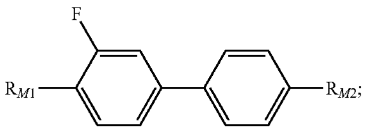

M-7

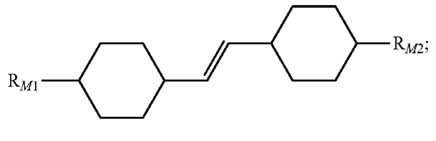

M-8

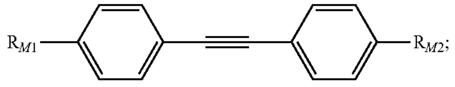

M-9

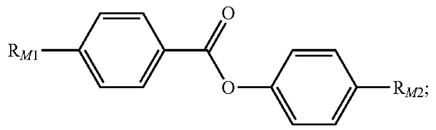

-continued

M-10

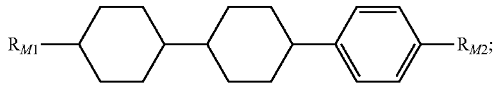

M-11

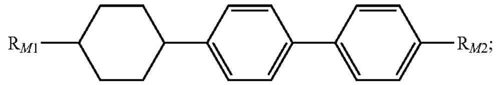

M-12

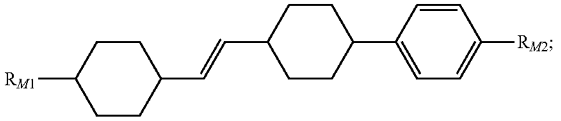

M-13

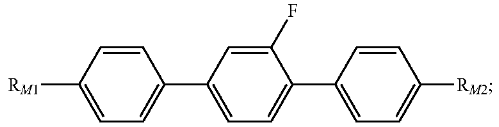

M-14

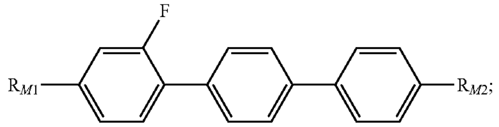

M-15

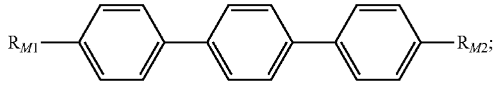

M-16

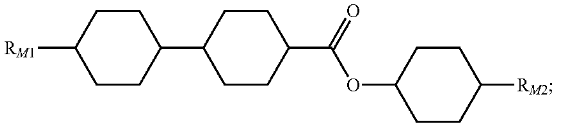

M-17

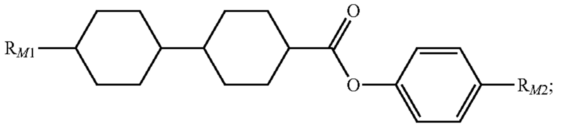

M-18

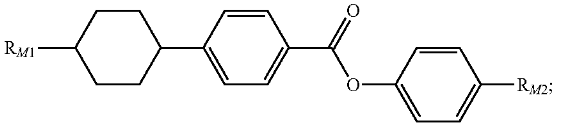

M-19

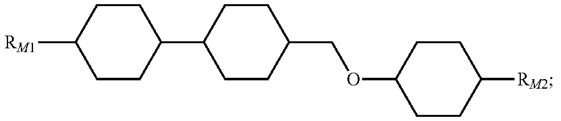

M-20

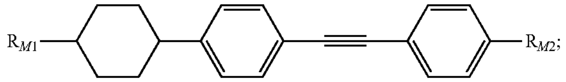

M-21

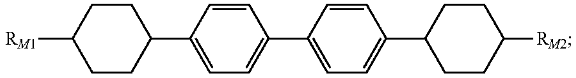

-continued

M-22

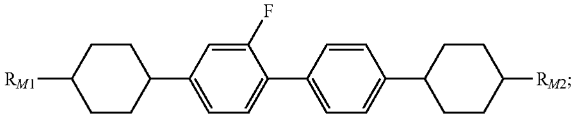

M-23

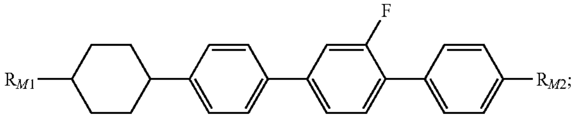

M-24

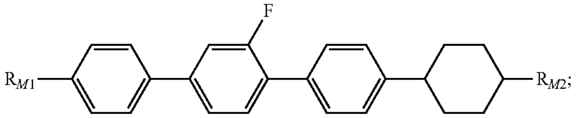

M-25

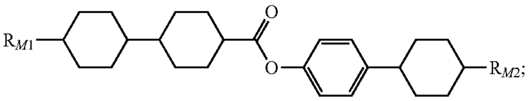 and

M-26

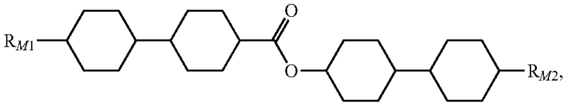

wherein, $R_{M1}$ and $R_{M2}$ each independently represents $C_{1-12}$ linear alkyl, $C_{3-12}$ branched alkyl,

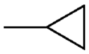, 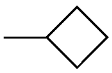 or 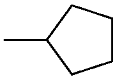, wherein one or at least two nonadjacent —$CH_2$— in the $C_{1-12}$ linear alkyl and $C_{3-12}$ branched alkyl can each be independently replaced by —CH═CH—, —C≡C—, —O—, —CO—, —CO—O— or —O—CO—.

21. The liquid crystal composition according to claim 1, wherein the compound of general formula M is any one of the compounds with the following structures:

M-1

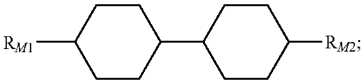

M-2

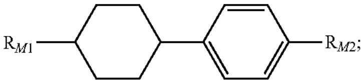

M-3

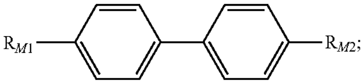

M-10

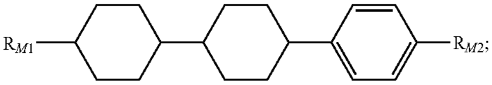

-continued

M-11

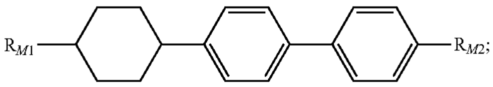

and

M-13

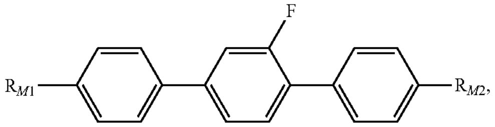

wherein, $R_{M1}$ and $R_{M2}$ each independently represents $C_{1-12}$ linear alkyl, $C_{3-12}$ branched alkyl,

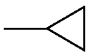
,
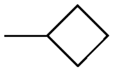
or
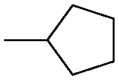
, wherein one or at least two nonadjacent —$CH_2$— in the $C_{1-12}$ linear alkyl and $C_{3-12}$ branched alkyl can each be independently replaced by —CH═CH—, —C≡C—, —O—, —CO—, —CO—O— or —O—CO—.

22. The liquid crystal composition according to claim 1, wherein, in the liquid crystal composition, percentage by weight of the compound of general formula Mis 40%-68%.

23. A liquid crystal display device, wherein the liquid crystal display device comprises the liquid crystal composition of claim 11.

* * * * *